US011800490B2

(12) United States Patent
Freda et al.

(10) Patent No.: US 11,800,490 B2
(45) Date of Patent: Oct. 24, 2023

(54) METHODS AND APPARATUSES FOR AUTONOMOUS RESOURCE SELECTION IN NEW RADIO VEHICLE TO EVERYTHING (NR V2X)

(71) Applicant: INTERDIGITAL PATENT HOLDINGS, INC., Wilmington, DE (US)

(72) Inventors: Martino M. Freda, Laval (CA); Tuong Duc Hoang, Montreal (CA); Tao Deng, Roslyn, NY (US); Aata El Hamss, Laval (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/264,991

(22) PCT Filed: Aug. 6, 2019

(86) PCT No.: PCT/US2019/045327
§ 371 (c)(1),
(2) Date: Feb. 1, 2021

(87) PCT Pub. No.: WO2020/033422
PCT Pub. Date: Feb. 13, 2020

(65) Prior Publication Data
US 2021/0329596 A1    Oct. 21, 2021

Related U.S. Application Data

(60) Provisional application No. 62/715,512, filed on Aug. 7, 2018, provisional application No. 62/735,981, filed on Sep. 25, 2018.

(51) Int. Cl.
*H04W 4/00*     (2018.01)
*H04W 72/02*    (2009.01)
(Continued)

(52) U.S. Cl.
CPC ....... *H04W 72/02* (2013.01); *H04W 28/0268* (2013.01); *H04W 72/542* (2023.01); *H04W 72/56* (2023.01)

(58) Field of Classification Search
CPC ............. H04W 72/02; H04W 28/0268; H04W 72/085; H04W 72/10; H04W 72/0406; H04W 72/082; H04W 4/40; H04W 92/18
(Continued)

(56) References Cited

U.S. PATENT DOCUMENTS 7,233,571 B1 *  6/2007  Krishnamurthy ... H04L 12/5601
                                                370/236
2016/0150551 A1   5/2016  Terry et al.
(Continued)

FOREIGN PATENT DOCUMENTS

WO    2017195538 A1   11/2017
WO    2018081979 A1    5/2018
WO    2018/129017      7/2018

OTHER PUBLICATIONS

Alcatel-Lucent Shanghai Bell et al., "Support for PC5 priority," 3GPP TSG RAN WG1 Meeting #82, R1-154599, Beijing, China (Aug. 24-28, 2015).
(Continued)

*Primary Examiner* — Chuong T Ho
(74) *Attorney, Agent, or Firm* — Volpe Koenig

(57) ABSTRACT

Methods and apparatuses are described herein for sidelink communication in a wireless transmit/receive unit (WTRU). For example, a first WTRU configured with first and second resource pools may perform at least one congestion measurement of the second resource pool. The first resource pool may be configured for use by the first WTRU for transmission of the first data. The second resource pool may be configured for use by a second WTRU for transmission of the second data associated with a higher priority than the
(Continued)

first data. If the at least one congestion measurement of the second resource pool is below a predetermined threshold, the first WTRU may transmit the first data using the first resource pool. If the at least one congestion measurement of the second resource pool is above a predetermined threshold, the first US may not transmit the first data using the first resource pool.

10 Claims, 7 Drawing Sheets

(51) Int. Cl.
 *H04W 28/02* (2009.01)
 *H04W 72/56* (2023.01)
 *H04W 72/542* (2023.01)
(58) Field of Classification Search
 USPC .................................................. 370/329, 330
 See application file for complete search history.

(56) References Cited

U.S. PATENT DOCUMENTS

| | | | |
|---|---|---|---|
| 2017/0150390 A1 | 5/2017 | Ahmad et al. | |
| 2019/0007747 A1* | 1/2019 | Bernat | H04L 67/61 |
| 2019/0053251 A1* | 2/2019 | Loehr | H04W 72/1263 |
| 2019/0313279 A1* | 10/2019 | Li | H04W 72/12 |
| 2019/0350011 A1* | 11/2019 | Li | H04L 5/0091 |
| 2020/0037307 A1* | 1/2020 | Kang | H04W 76/14 |
| 2020/0267523 A1* | 8/2020 | Tang | H04L 5/001 |
| 2020/0305152 A1 | 9/2020 | Yasukawa et al. | |
| 2021/0410129 A1* | 12/2021 | Freda | H04W 76/18 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "NR Sidelink Physical Layer Structures and Procedures," 3GPP TSG RAN WG1 Meeting #94bis, R1-1811213, Chengdu, China (Oct. 8-12, 2018).

Interdigital Inc., "QoS Management for NR V2X," 3GPP RAN WG2 Meeting #103bis, R2-1814018, Chengdu, China (Oct. 8-12, 2018).

Interdigital Inc., "QoS Management for NR V2X," 3GPP RAN WG2 Meeting #104, R2-1816790, Spokane, USA (Nov. 12-16, 2018).

Interdigital Inc., "QoS Management for NR V2X," 3GPP RAN WG2 Meeting #105, R2-1901575, Athens, Greece (Feb. 25-Mar. 1, 2019).

Interdigital Inc., "QoS Management for NR V2X," 3GPP RAN WG2 Meeting #106, R2-1906386, Reno, USA (May 13-17, 2019).

Interdigital Inc., "QoS Management for NR V2X," 3GPP TSG RAN WG1 Meeting #94bis, R1-1811116, Chengdu, China (Oct. 8-12, 2018).

Interdigital Inc., "QoS Management for NR V2X," QoS Management for NR V2X, R2-1904218, Xi'an, China (Apr. 8-12, 2019).

Interdigital Inc., "Resource Allocation for NR V2X," 3GPP RAN WG1 Meeting #94, R1-1808599, Gothenburg, Sweden (Aug. 20-24, 2018).

Nokia et al., "On UL multiplexing between eMBB and URLLC," 3GPP TSG-RAN WG1 Meeting #92bis, R1-1804618, Sanya, China (Apr. 16-20, 2018).

Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).

Third Generation Partnership Project, "Technical Specification Group Services and System Aspects; Study on enhancement of 3GPP Support for 5G V2X Services (Release 16)," 3GPP TR 22.886 V16.2.0 (Dec. 2018).

Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).

Third Generation Partnership Project, "Technical Specification Group Radio Access Network; Evolved Universal Terrestrial Radio Access (E-UTRA); Physical layer procedures (Release 15)," 3GPP TS 36.213 V15.2.0 (Jun. 2018).

Third Generation Partnership Project, "Technical Specification Group Radio Access Network; NR; Physical layer procedures for data (Release 15)," 3GPP TS 38.214 V15.2.0 (Jun. 2018).

Third Generation Partnership Project, "Technical Specification Group Radio Access Network; NR; Physical layer procedures for data (Release 15)," 3GPP TS 38.214 V15.6.0 (Jun. 2019).

Third Generation Partnership Project, "Technical Specification Group Radio Access Network; NR; Medium Access Control (MAC) protocol specification (Release 15)," 3GPP TS 38.321 V15.2.0 (Jun. 2018).

Third Generation Partnership Project, "Technical Specification Group Radio Access Network; Evolved Universal Terrestrial Radio Access (E-UTRA); Physical layer procedures (Release 15)," 3GPP TS 36.213 V15.6.0 (Jun. 2019).

Third Generation Partnership Project, "Technical Specification Group Radio Access Network; NR; Multiplexing and channel coding (Release 15)," 3GPP TS 38.212 V15.6.0 (Jun. 2019).

Third Generation Partnership Project, "Technical Specification Group Radio Access Network; NR; Multiplexing and channel coding (Release 15)," 3GPP TS 38.212 V15.2.0 (Jun. 2018).

Third Generation Partnership Project, "Technical Specification Group Radio Access Network; NR; Radio Resource Control (RRC) protocol specification (Release 15)," 3GPP TS 38.331 V15.6.0 (Jun. 2019).

Third Generation Partnership Project, "Technical Specification Group Radio Access Network; NR; Medium Access Control (MAC) protocol specification (Release 15)," 3GPP TS 38.321 V15.6.0 (Jun. 2019).

Third Generation Partnership Project, "Technical Specification Group Radio Access Network; NR; Radio Resource Control (RRC) protocol specification (Release 15)," 3GPP TS 38.331 V15.2.1 (Jun. 2018).

(56) References Cited

OTHER PUBLICATIONS

Third Generation Partnership Project, "Technical Specification Group Services and System Aspects; Enhancement of 3GPP support for V2X scenarios; Stage 1 (Release 15)," 3GPP TS 22.186 V15.3.0 (Jun. 2018).

Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).

Third Generation Partnership Project, "Technical Specification Group Services and System Aspects; Study on enhancement of 3GPP Support for 5G V2X Services (Release 15)," 3GPP TR 22.886 V15.1.0 (Mar. 2017).

Third Generation Partnership Project, "Technical Specification Group Services and System Aspects; Study on enhancement of 3GPP Support for 5G V2X Services (Release 16)," 3GPP TR 22.886 V16.0.0 (Jun. 2018).

Astri et al., "Resource selection for V2X systems supporting CA," 3GPP TSG RAN WG1 Meeting 90bis, R1-1717415, Prague, CZ (Oct. 9-13, 2017).

Huawei et al., "Remaining details of congestion control," 3GPP TSG RAN WG1 Meeting #88, R1-1701726, Athens, Greece (Feb. 13-17, 2017).

LG Electronics, "Remaining issues on congestion control for PC5-based V2X," 3GPP TSG RAN WG1 Meeting #88, R1-1702397, Athens, Greece (Feb. 13-17, 2017).

\* cited by examiner

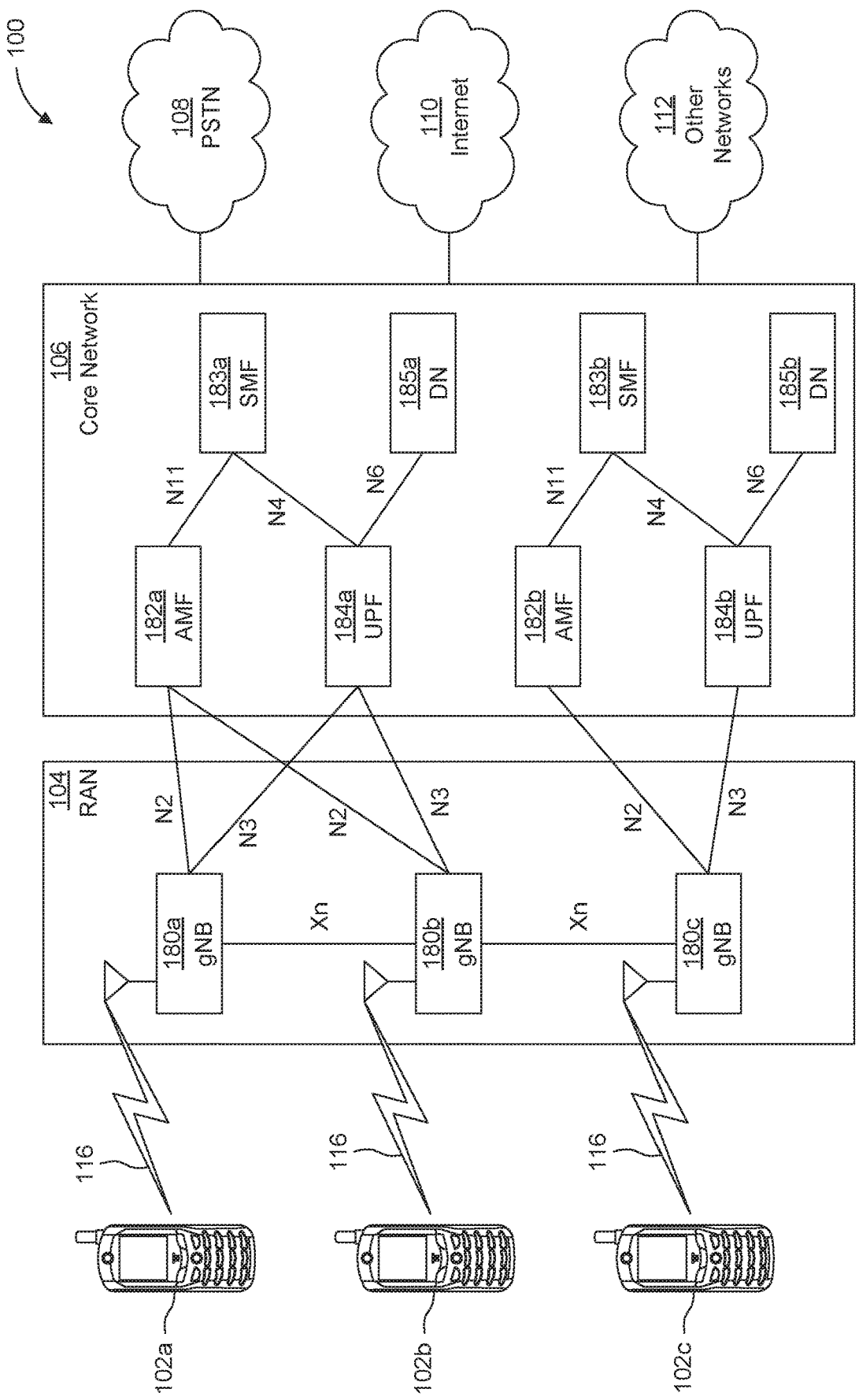

METHODS AND APPARATUSES FOR AUTONOMOUS RESOURCE SELECTION IN NEW RADIO VEHICLE TO EVERYTHING (NR V2X)

CROSS REFERENCE TO RELATED APPLICATION

This application is the U.S. National Stage, under 35 U.S.C. § 371, of International Application No. PCT/US2019/045327 filed Aug. 6, 2019, which claims the benefit of U.S. Provisional Application No. 62/715,512, filed on Aug. 7, 2018, and U.S. Provisional Application No. 62/735,981, filed on Sep. 25, 2018, the contents of which are hereby incorporated by reference herein.

BACKGROUND

In Long Term Evolution Device to Device (LTE D2D) communications, a Wireless Transmit/Receive Unit (WTRU) may select radio resources based on the priority of transmission that is preassigned or preconfigured to the WTRU. In Long Term Evolution Vehicle to Everything (LTE V2X) communications, a WTRU may use a single resource pool to transmit data having a limited number of Quality of Service (QoS) requirements. Compared to LTE D2D and LTE V2X, New Radio Vehicle to Everything (NR V2X) implements a wider range of QoS that requires more efficient/dynamic resource selections. For example, latency requirements for NR V2X are much smaller than those of LTE D2D and LTE V2X. Data rate and reliability requirements are much larger for NR V2X than LTE D2D and LTE V2X. Thus, in order to meet the increased QoS requirements in NR V2X, methods and apparatuses that efficiently/dynamically select radio resources, especially during the periods of high congestion, are needed.

SUMMARY

Methods and apparatuses are described herein for sidelink communication in a wireless transmit/receive unit (WTRU) in New Radio Vehicle to Everything (NR V2X). For example, a first WTRU configured with a first resource pool and a second resource pool may perform at least one congestion measurement of the second resource pool to determine a transmission of first data on the first resource pool. The first resource pool may be configured for use by the first WTRU for transmission of the first data. The second resource pool may be configured for use by a second WTRU for transmission of the second data. The second data may be associated with a higher priority than the first data. The at least one congestion measurement may comprise at least one of channel occupancy, received signal strength, or channel busy ratio.

Based on the at least one congestion measurement of the second resource pool associated with the second WTRU, the first WTRU may transmit or not transmit the first data on the first resource pool. Specifically, if the at least one congestion measurement of the second resource pool is below a predetermined threshold, the first WTRU may transmit the first data using the first resource pool. If the at least one congestion measurement of the second resource pool is above a predetermined threshold, the first WTRU may defer the transmission of the first data on the first resource pool for a predetermined period of time. If the at least one congestion measurement of the second resource pool is above a predetermined threshold, the first WTRU may preempt a reserved transmission (or future transmission) of the first data on the first resource pool. If the at least one congestion measurement on the second resource pool is above a predetermined threshold, the first WTRU may reduce an amount of resources in the first resource pool and then transmit the first data using the remaining resources in the first resource pool.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1D is a system diagram illustrating a further example RAN and a further example CN that may be used within the communications system illustrated in FIG. 1A according to an embodiment;

DETAILED DESCRIPTION

Figure 1A:
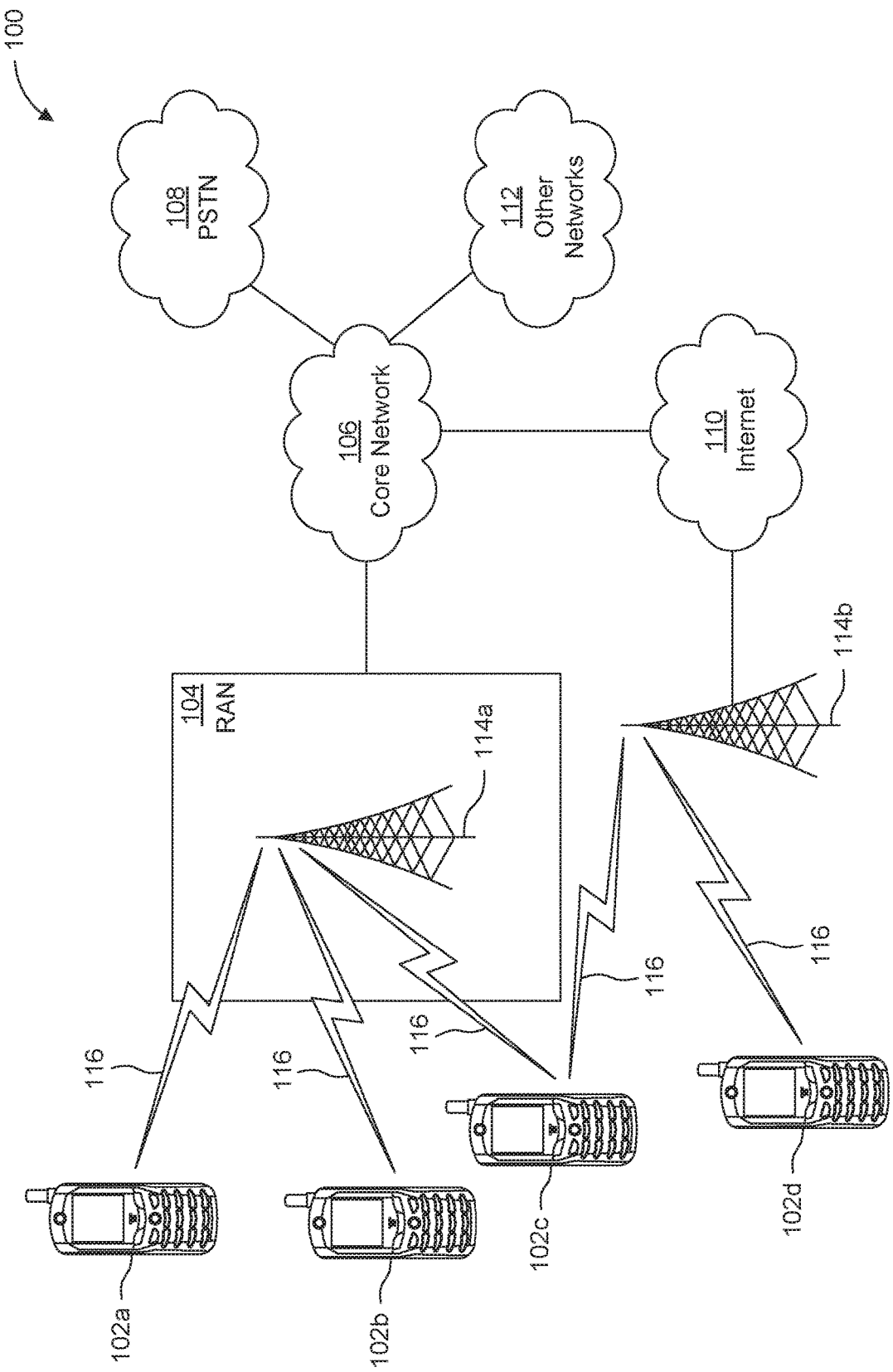
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
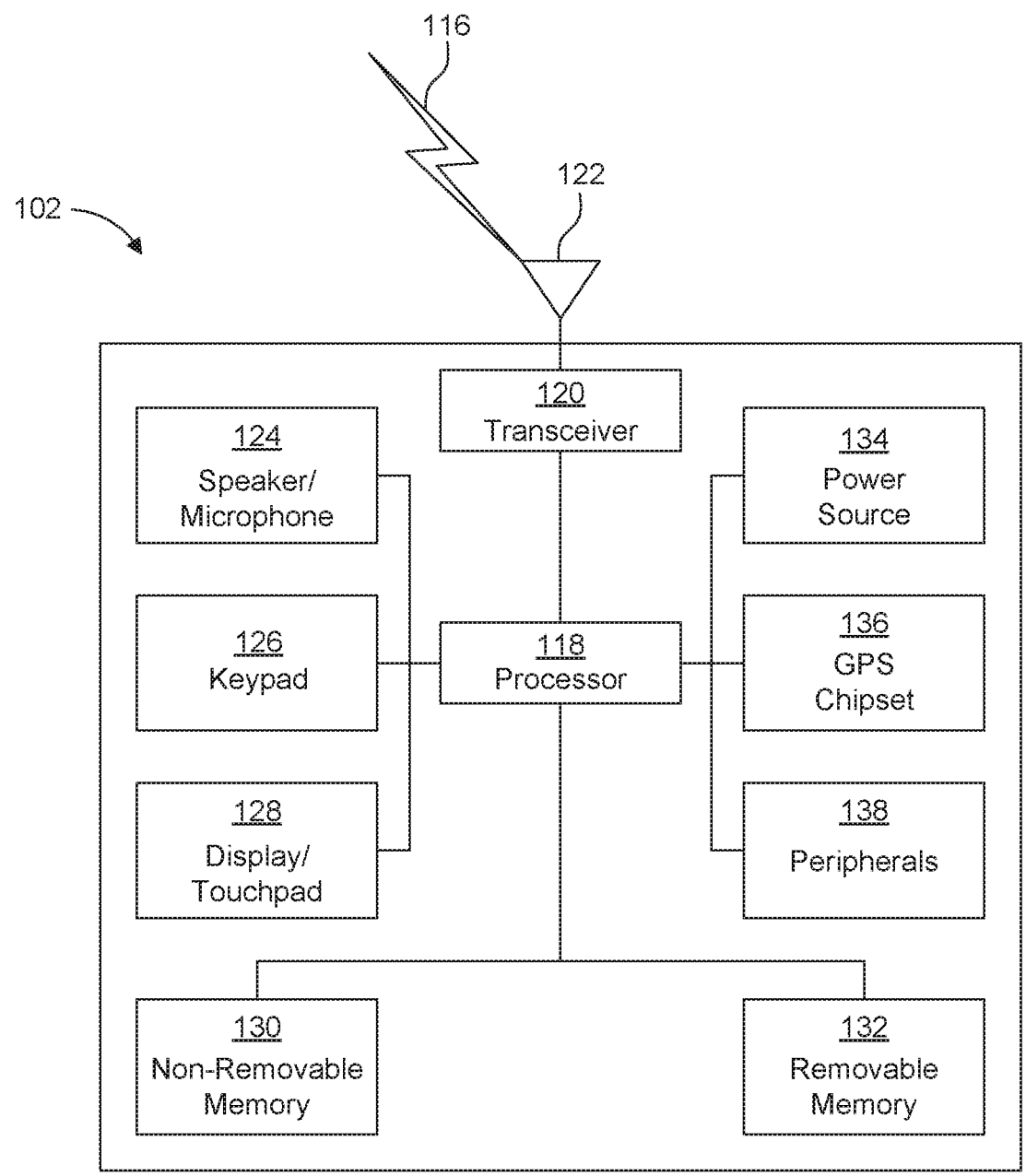
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
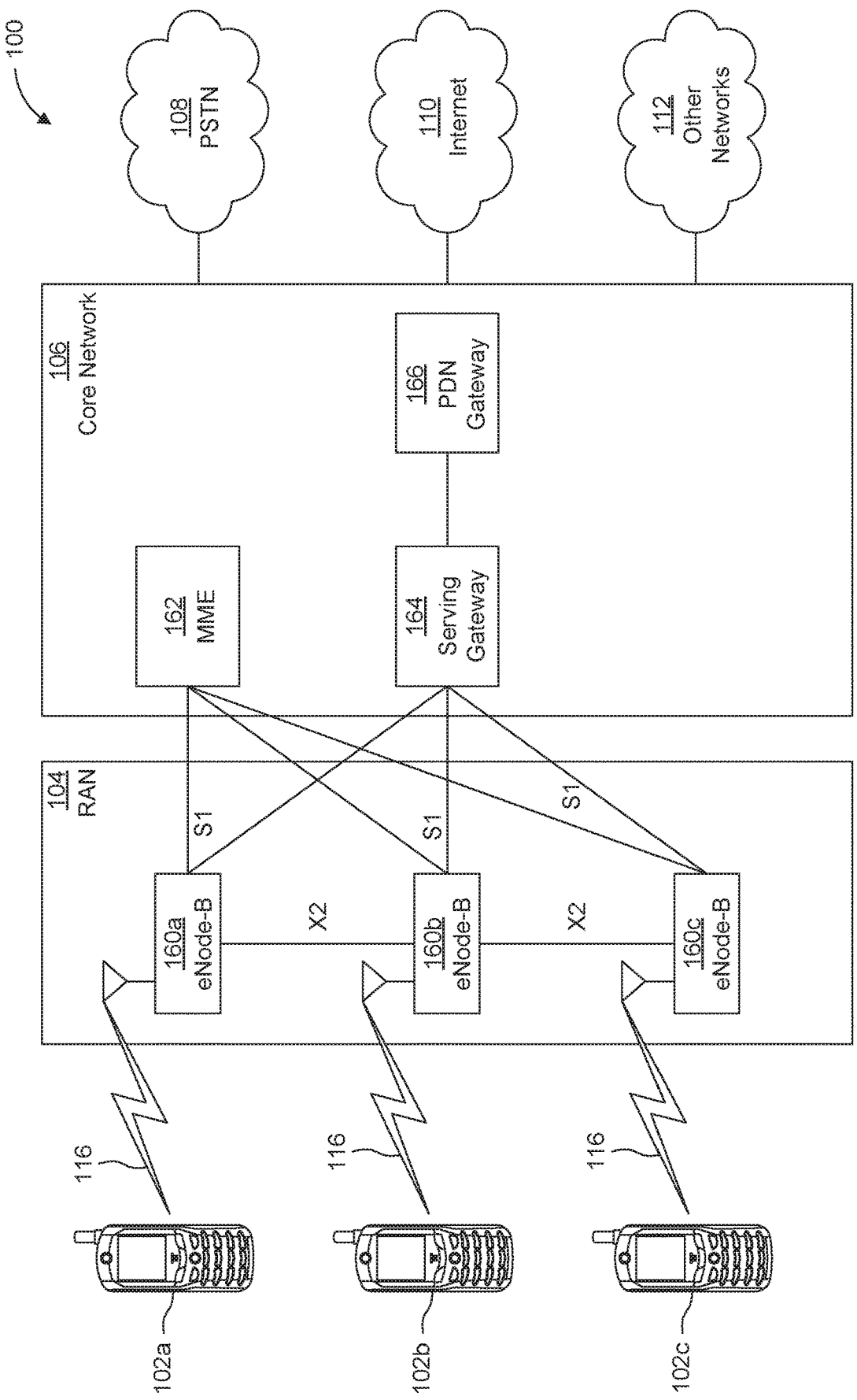
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Vehicular communication such as Vehicle to Everything (V2X) is a mode of communication whereby WTRUs can communicate with each other directly. There may be different modes of operation in vehicular (V2X) communication. For example, in Mode 3, the network may give a WTRU a scheduling assignment for V2X sidelink transmission. In Mode 4, a WTRU may autonomously select the resources from a configured/pre-configured resource pool. There may be different categories of resource pools. Receiving resource pools may be monitored for receiving V2X transmission. V2X transmitting resource pools may be used by WTRUs to select the transmission resource in Mode 4. Transmitting resource pools may not be used by WTRUs configured in Mode 3.

The resource pool configuration or resource pools may be semi-statically or dynamically signaled to WTRUs via radio resource control (RRC) signaling or system information broadcasting (e.g., SIB). In Mode 4, the WTRU may use sensing before selecting a resource from the RRC configured transmitting pool. Pool configuration may be carried via a System Information Block (SIB) and/or dedicated RRC signaling.

As used herein, the term resource pool may refer to one or more sets of radio resources. The terms resource pool, pool, and radio resource pool may be interchangeably used throughout this disclosure. The term resource (or radio resource) may refer to one or more elements selected from time, frequency, and/or spatial domains. Examples of resources may include, but are not limited to resource blocks (RB), resource elements (RE), frequencies, radio frames, subframes, subchannels, symbols, subcarriers, beam patterns, and antenna arrangements.

New Radio (NR) systems are expected to support a number of use cases, such as enhanced Mobile Broadband (eMBB), ultra-high reliability and low latency communications (URLLC). Enhanced V2X (eV2X) communication in NR systems is expected to support new services for both safety and non-safety scenarios (e.g., sensor sharing, automated driving, vehicle platooning, and remote driving). Different eV2X services require different performance requirements. For some scenarios, 3 ms latency may be required.

A new use case of V2X in NR systems may be vehicle platooning. Vehicle platooning may enable the vehicles to dynamically form a group travelling together. The vehicles in the platoon may receive periodic data from the leading vehicle in order to carry on platoon operations. This information may allow the distance between vehicles to become extremely small (e.g., the gap distance translated to time can be in the range of sub seconds). Platooning applications may allow the vehicles following to be autonomously driven.

Another new use case of V2X in NR systems may be advanced driving. Advanced driving may enable semi-automated or fully-automated driving. Longer inter-vehicle distance may be assumed. Each vehicle and/or roadside unit (RSU) may share data obtained from its local sensors with vehicles in proximity, thus allowing vehicles to coordinate their trajectories or maneuvers. In addition, each vehicle may share its driving intention with vehicles in proximity. The benefits of this use case group are safer traveling, collision avoidance, and improved traffic efficiency.

Another new use case of V2X in NR systems may be extended sensors. Extended sensors may enable the exchange of raw or processed data gathered through local sensors or live video data among vehicles, RSUs, devices of pedestrians and V2X application servers. The vehicles may enhance the perception of their environment beyond what their own sensors can detect and have a more holistic view of the local situation.

Another new use case of V2X in NR systems may be remote driving. Remote driving may enable a remote driver or a V2X application to operate a remote vehicle for those passengers who cannot drive themselves or a remote vehicle located in dangerous environments. For a case where variation is limited and routes are predictable, such as public transportation, driving based on cloud computing may be used. In addition, access to cloud-based back-end service platform can be considered for this use case group.

Resource selection for mode 4 in V2X may be based on the use of sensing results, congestion measurements, or any other method. In an example, upon triggering a resource selection or resource reselection procedure, a WTRU may check the sensing results over a time period such the last one second (i.e., the period of time represented by subframes [n−1000, n] where n is the instant of time in which resource selection was triggered). The sensing results may include all detected Sidelink Control Information (SCI) transmissions in the last time period.

The WTRU may determine the available resources in the time period [n+T1, n−FT2]. T1 is may be determined by WTRU implementation. T2 may represent the set of selectable resources and may be determined based on the latency requirements of the data to be transmitted. Specifically, T2 may satisfy $T2_{min}<T2<100$, where $T2_{min}$ may be configured by the network and T2 is such that it satisfies latency requirements of the packet received from the upper layers.

Resource availability may be determined by the ProSe Per-Packet Priority (PPPP) of the data to be transmitted relative to the PPPP associated with the other WTRU transmissions in the last second. Specifically, the WTRU may be configured with a set of Physical Sidelink Control Channel (PSCCH) Reference Signal Receive Power (RSRP) thresholds for each combination of transmitted and received PPPP. If the Sidelink Control Information (SCI) transmitted by another WTRU reserves resources in the window [n+T1, n+T2], or any subsequent window depending on the WTRU's own period of transmission, and the measured RSRP of the SCI is above the threshold configured for the PPPP to be transmitted and the PPPP contained in the received SCI, the WTRU may consider such resources to be occupied.

Before performing resource selection, a WTRU may determine whether the amount of available resources is above, for example, 20% of the resources in the selectable time window. If so, the WTRU may perform random selection among the 20% of resources with the lowest Received Signal Strength Indicator (RSSI). Otherwise, the WTRU may repeat the determination of available resources again by decreasing each of the network (NW) configured RSRP thresholds by 3 dB.

A Mode 4 WTRU may reserve future resources for periodic transmissions by indicating, in the SCI that indicates the subchannels for transmission, an indication that it will keep/reserve the same resources for the next period, as well as the actual period of transmission. A WTRU may be aware of the intentions of a transmitting WTRU to keep the resources for its next reservation period. During resource selection associated with periodic traffic, a WTRU may randomly select a number of periods in which it will maintain/reserve the resources. It may then set the resource reservation flag in the SCI with each of its transmissions a number of times equal to this random selection. Furthermore, once the number of successive transmissions on the same resources has expired, a WTRU may further decide whether to keep or reselect new resources. Such decision may also be randomly performed at the WTRU.

In conventional V2X, PC5 Quality of Service (QoS) is managed by the parameters of PPPP and ProSe Per Packet Reliability (PPPR). A WTRU in V2X may receive a packet from upper layers with a PPPP and possibly a PPPR. The PPPP is used for prioritization in Logical Channel Prioritization (LCP). WTRUs may prioritize data with lower PPPP when selecting data to be transmitted in a sidelink grant. In addition, the PPPP may be implicitly provided to the eNB via the Logical Channel (LCG) for the eNB to prioritize mode 3 transmissions between different WTRUs. A WTRU may use PPPR to determine whether to duplicate a transmission over two separate carriers. A WTRU may be configured with a PPPR threshold by the network. If a packet is received with a PPPR below the threshold (i.e. higher reliability requirements), the WTRU may transmit the same packet on two different carriers.

The QoS requirements for NR V2X may be different from that of conventional V2X. The previously defined PPPP/PPPR may not satisfy the needs of the new use cases. There may be more QoS parameters to consider for the eV2X services, such as: Payload (Bytes); Transmission rate (Message/Sec); Maximum end-to-end latency (ms); Reliability (%); Data rate (Mbps); and Minimum required communication range (meters).

It should be noted that the same set of service requirements may apply to both PC5 based V2X communication and Uu based V2X communication. NR V2X may have a unified QoS model for PC5 and Uu that uses 5QIs for V2X communication over PC5. In this way, the application layer may have a consistent way of indicating QoS requirements regardless of the link used.

For unicast and multicast type of traffic, the same QoS Model as that of Uu may be utilized (i.e. each of the unicast links may be treated as a bearer and QoS flows may be associated). The QoS characteristics defined in 5G QoS Indicator (5QI) and the additional parameter of data rate may apply. In addition, the minimum required communication range may be treated as an additional parameter specifically for PC5 use.

For broadcast traffic, there is no bearer concept. In this case, the 5QI may be used in a similar manner as that of the PPPP/PPPR (i.e., to be tagged with each of the packet). A new set of 5QI may be defined specifically for NR V2X termed V2X 5QI (VQI).

The availability of resources for WTRUs with different timing requirements is discussed herein. For example, per packet latency requirements in conventional V2X are as low as 10 ms for certain use cases. Other use cases, on the other hand, allow for latency of 100 ms. In NR V2X, latency requirements may vary between 100 ms and 3 ms. The resource selection mechanism in V2X may rely on determining the resource selection window (i.e. T2) based on the latency requirements of the packet to be transmitted. Subframes (e.g., with a duration of 1 ms) may be selected from this window. This resource selection mechanism may present the following issues. As T2 is reduced (e.g., for time critical WTRUs), the number of resources a WTRU may select from is less and the likelihood of collisions is increased. A scheme where non-time critical WTRUs may select resources in time which occur immediately does not promote fairness in the resource selection between WTRUs with time critical transmissions and WTRUs without time critical transmissions.

Furthermore, an over-allocation of resources for random selection that may not be efficient for large bandwidth applications is discussed herein. As discussed above, resource selection may be based on determination of 20% of available resources and random selection among these resources. Having such a large ratio of available resources from which to perform random selection may ensure that WTRUs performing resource selection during the same reservation period do not collide.

For NR V2X, packet sizes and data rates may be significantly larger. A WTRU may need to reserve a larger amount of resources compared to conventional V2X. In addition, the reliability requirements (error rate) may be more stringent in NR V2X. Increasing the availability threshold by 3 dB to artificially achieve 20% of resources available may not be feasible for NR V2X resource selection.

NR resource selection may need to consider new NR RAT characteristics, such as beam-based transmissions in high frequency and different Transmission Time Interval (TTI) formats (e.g., slot-based and symbol-based).

Conventional V2X PC5 resource selection is based on QoS model defined by PPPP (e.g., priority and delay budget). NR V2X resource selection may need to consider new NR QoS requirements of latency, reliability, congestion, minimum transmission range, or the like. A new resource selection mechanism for Mode 4 PC5 that addresses the above issues may be desirable for NR V2X.

Figure 2:
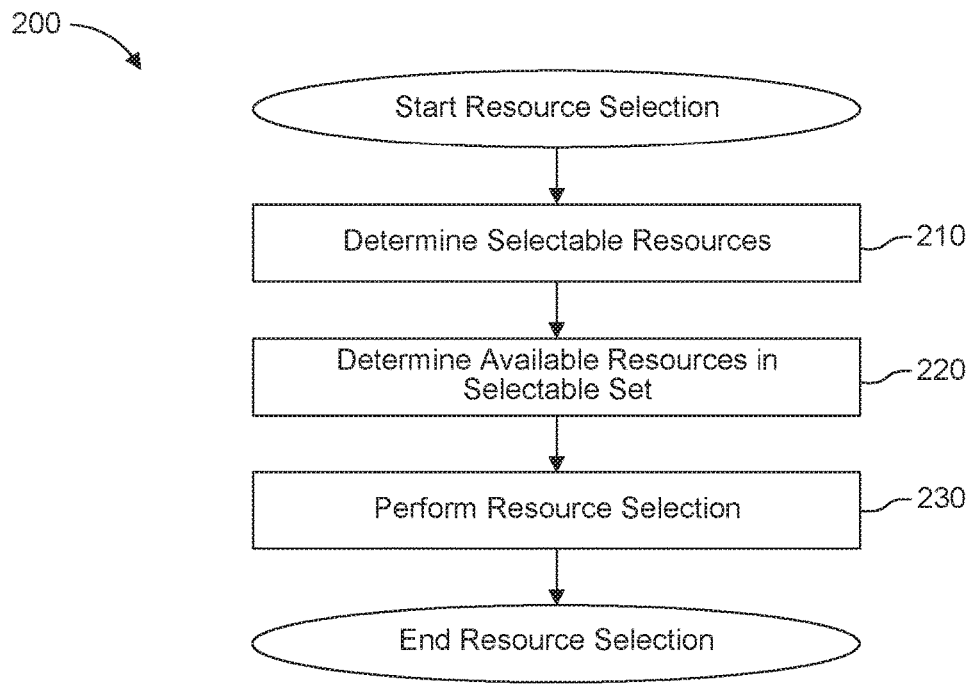
FIG. 2 is a diagram illustrating an example procedure of resource selection.

FIG. 2 illustrates an example resource selection procedure 200, which may be used in combination with any of other embodiments described herein. At step 210, a WTRU may determine a set of time/frequency/beam resources from which resource selection may take place (i.e., the set of selectable resources). Such resources may meet the latency requirements of the data to be transmitted. Upon determining the selectable resources, at step 220, the WTRU may determine the number of available resources (e.g., based on criteria including the determination of usage of resources by other WTRUs). The WTRU may determine whether such resources are sufficient to transmit the required data. At step 230, the WTRU may select the actual resources to transmit on from the set of available resources.

Resource granularity of a specific time/frequency resource may be statically defined, or may be dynamically defined/determined by the WTRU. The WTRU may determine the granularity (e.g., slot-based or symbol-based) of a specific resource (time/frequency/beam) based on one or more of the following.

The WTRU may determine granularity based on resource pool configuration. For example, a WTRU may receive one or more transmit/receive pool configurations from the network (e.g., base station), which define the allowable time/frequency/beam resources for that pool, in addition to indicating the resource granularity of each of the resources within the resource pool. A resource pool may be associated with one granularity of resource (e.g., low granularity or slot-based). A resource pool may be associated with resources of both high granularity (e.g., symbol) and low granularity (e.g., slot), as well as an indication of which resources are of each type, and potentially the actual granularity.

The WTRU may autonomously determine the granularity of a resource during the determination of selectable resources, or during resource selection. Such determination may be made based on the time criticality of the data that it has available for transmission. For example, the WTRU may decide that it can transmit on a specific time/frequency/beam resource (e.g., one slot over multiple resource blocks) using symbol-based transmission on a subset of symbols within that slot. The determination may be based on sensing results or the like.

The WTRU may determine granularity based network (NW) signaling. A WTRU may receive NW signaling (e.g., DCI) that indicates/changes the granularity of a specific resource.

The WTRU may determine the resource granularity during the determination of the selectable resources. It may then use such determination in the actual resource selection. Alternatively or additionally, the WTRU may perform determination of the selectable resources without determining the granularity of such resources. At the time of resource selection, it may determine the resource granularity and perform resource selection based on this.

Resources associated with different service types may have different time granularity. More specifically, one service may be associated with transmission over resources with symbol-based granularity. In this case, a packet may be transmitted entirely over a one or more OFDM symbols and one or more resource blocks in frequency. On the other hand, for another service, a packet may be transmitted entirely using one or more slots and one or more resource blocks in frequency. In the description below, the example of different resource granularity is used to refer to different service-based resource types. It should be understood that the examples that mention different resource granularities may also refer to different resource types (e.g., associated with different services) that are not necessarily restricted only to granularity.

A WTRU may determine the set of resources from which it can select transmission resources based on the service type, criticality, or other QoS related parameters associated with the data to be transmitted. A WTRU may be configured with a first set of resources from which it can select for use with a first service type/criticality/QoS and it may be configured with a second set of resources from which it can select for use with a second service type/criticality/QoS. A WTRU may restrict any resource of the resource selection activities described herein: determination of the selectable resources, monitoring of sensing results over a period of time (T) prior to resource selection, determination of the available resources, and selection of the transmission resources. The restriction may apply to the resources associated with the service type.

For example, for time critical transmissions, the WTRU may select from or use as selectable resources high granularity resources (e.g., symbol-based resources). Otherwise, the WTRU may use as selectable resources low granularity (e.g., slot based resources) or fewer high granularity resources.

This approach may be applicable when the resource granularity for a specific time/frequency/beam resource is defined statically (e.g., by configuration). For example, the WTRU may be configured with a set of resources which are slot-based and a set of resources which are symbol-based any may select from slot-based or symbol-based accordingly.

A WTRU may be configured to determine an amount or percentage of resources of each granularity to select based on one or more of the following criteria. The WTRU may use QoS characteristics (e.g. priority, maximum delay, reliability, transmission range, etc.) of any pending data to be transmitted, such as time criticality for the determination. For example, a WTRU may select more symbol based resources as part of the selectable resources when it has time critical or more time critical resources.

The WTRU may use sensing results, such as RSSI, RSRP of scheduling assignment (SA) or SCI, and measured occupancy for the determination. For example, a WTRU may select more slot based resources as part of the selectable resources if an overall measure of RSSI on slot-based resources is below/above a threshold, if it is below/above the overall measure of RSSI on symbol-based resources. The WTRU may determine the percentage or amount of slot-based or symbol-based resources based on the amount of available resources of each type (determined based on sensing results) in a specific time window.

The WTRU may measure of channel occupancy on each granularity of resources to make the determination. For example, the WTRU may determine a channel busy ratio (CBR) for resources of different granularity (e.g., slot-based vs symbol-based) and may select the ratio/amount based on the CBR and possibly other factors.

The WTRU may use a NW configuration to make the determination. For example, a WTRU may be configured statically with a percentage of resources to use associated with each granularity The WTRU may use WTRU type and/or intended recipient to make the determination. This may be based on destination address, or depending on whether the destination is unicast/multicast/broadcast.

In one example, the WTRU may use the time criticality of the data to be transmitted to select a window [T1,T2] of time/frequency resources which meet the latency requirements of the data to transmit. Within those resources, the WTRU may determine whether it can perform symbol based transmissions based on the latency requirement and/or the selected value of T2. For example, if T2<threshold, the WTRU may use an amount (e.g., x %) of the time frequency resources as symbol based resources for resource selection. In this case, the set of allowable resources may include both symbol-based (up to x %) and slot-based resources. In another example, the WTRU may determine the amount of symbol-based resources which are usable based on the PPPP or other QoS-related parameter associated with the data to be transmitted. A WTRU may select resources which are only of one granularity (e.g., only symbol-based) for a given resource selection attempt. Such selection may be based on any or a combination of the following criteria: QoS of data to be transmitted (e.g., priority, required maximum latency, etc.) that triggered the selection process; WTRU type; intended recipient (e.g., based on destination address, or depending on whether the destination is unicast/multicast/broadcast); resource pool type or resource pool configuration (e.g., a WTRU may be configured with a TX pool comprising a specific granularity and the WTRU may select this pool based on other conditions); and NW configuration.

A WTRU may be configured with a set of resources that can be either used only for slot-based transmission, symbol-based transmission, or can be used for either slot-based or symbol-based transmission. A WTRU allowed to select slot/symbol-based transmission may select from the slot/symbol-based resources and the "flexible" resources (resources that can be used for either slot-based or symbol-based transmissions).

For example, such configuration may be present in the transmit pool configuration of the WTRU. The resources may be configured in two separate resource pools (e.g., a first resource pool that configures all slot-based resources and a second resource pool that configures all resources that can be used as symbol-based or slot based). The resources may be configured in three separate resource pools (e.g., slot pool, symbol pool, and pool of either slot/symbol). The configuration may be per WTRU (e.g., via dedicated RRC configuration or pre-configuration) or per cell (e.g., via SIB). The advantage this approach is that it avoids excessive resource fragmentation that may occur with a purely WTRU autonomous selection of granularity (e.g., in the case WTRUs select symbol-based transmissions sparsely). A WTRU performing symbol/slot-based transmissions may further be limited to whether and how many symbol-based resources it can select from the "flexible" set of resources based on any of the following: QoS requirements, such as priority, reliability, or range for a transmission; amount of data to be transmitted with a given priority; required beam direction, angle (number of beams) for transmission; whether the selection is for unicast/multicast/broadcast transmission; and measured CBR on the set of resources.

Alternatively or additionally, the WTRU may autonomously decide which resources are symbol-based resources and which resources are slot based resources. A WTRU may further make such decision based on sensing results obtained from the lower layers, or the resource selection criteria further described herein, such as the amount of determined occupied resources of each type, CBR measurements associated with each type, etc. The WTRU may further make such decisions based on the time criticality of its transmissions.

The WTRU may determine that a subchannel (e.g., single RB over a slot) has certain symbols occupied by transmissions of another WTRU. The remaining unoccupied transmissions can be considered by the WTRU as selectable symbol-based resources.

The WTRU may determine the amount of slot based and symbol based transmissions over a time window. The WTRU may determine whether a transmission resource (e.g., determined available based on sensing results) is symbol based or slot based using the ratio of occupied symbol-based and slot-based resources (e.g., to maintain a certain amount of symbol-based resources in a specific time window).

The WTRU may further use any of the same criteria for autonomously determining the granularity as defined for selecting the number of symbol based resources from the set of flexible resources.

The WTRU may determine a subchannel (e.g., single RB over a slot) has certain symbols occupied by transmissions of another WTRU. The remaining unoccupied transmissions can be considered by the WTRU as selectable symbol-based resources.

The WTRU may determine the amount of slot based and symbol based transmissions over a time window. The WTRU may determine whether a transmission resource (e.g., determined available based on sensing results) is symbol based or slot based using the ratio of occupied symbol-based and slot-based resources (e.g., to maintain a certain amount of symbol-based resources in a specific time window).

The WTRU may further use any of the same criteria for autonomously determining the granularity as defined for selecting the number of symbol based resources from the set of flexible resources.

The WTRU may determine or derive the time criticality of a transmission using one or more of the following criteria: an absolute or relative time (e.g., frame, subframe, slot, etc.) by which the WTRU is required to transmit a packet from higher layers; a QoS-related parameter attached to the packet, such as V2X 5QI (VQI), priority (PPPP), reliability (PPPR), and expected throughput (e.g., prioritized bit rate); the QoS flow or flow identification associated with the transmission; an association to a sidelink radio bearer or similar; an application type, such as safety, remote driving, platooning, URLLC, and eMBB; an intended recipient (e.g., destination address or identity), intended recipient role (e.g., platoon leader, follower, relay node, etc.); and a determined transmission type or transmission characteristics, such as beam swept transmission, unicast/multicast/broadcast.

The WTRU may determine any of bandwidth, center location of resources, beams, starting time, or resource granularity based on time criticality.

The WTRU may select resources from a selectable set that is determined by the time latency/criticality of the data to be transmitted on those resources. Specifically, the WTRU may be allowed to select from a larger/smaller amount of resources depending on the time criticality and/or expected transmission/reception time of some or all of the data to be transmitted on those resources.

Following determination of the time criticality of the transmission, the WTRU may apply certain restrictions/rules/criteria to determine the amount of allowable resources from which resource selection is permitted. Specifically, the WTRU may determine any of the following parameters defining the amount of available resources based on the time criticality. The WTRU may determine bandwidth in terms of the number of resource blocks, carriers, and BWPs that can be used. The WTRU may determine beam-related criteria that define the number of resources, such as the number of beams, the beam width/angle, and beamsweeping frequency.

The WTRU may select resources from a selectable set that is determined by the time latency/criticality of the data to be transmitted on those resources. More specifically, the WTRU may be allowed to select from a larger/smaller amount of resources depending on the time criticality and/or expected transmission/reception time of some or all of the data to be transmitted on those resources.

The WTRU may determine a time instant, T, based on the association of a QoS parameter from upper layers (e.g., latency) to required transmission time. Based on this latency, the WTRU may determine the total number of resources from which resource selection can be performed by calculating the number of resource elements (e.g., slot-based or symbol-based resource blocks) that occur prior to T in a bandwidth B, and set the bandwidth B such that the total number of resources is fixed. The total number of resources can be configured by the network, or preconfigured (e.g., for out of coverage WTRUs). In such example, the WTRU may further calculate the total number of resources based on: current usage characteristic of a resource pool, bandwidth part (BWP), carrier, etc. calculated at the WTRU (e.g., channel busy ratio (CBR)); QoS-related parameters attached to the data to be transmitted (e.g., priority, reliability, etc.); transmission characteristics (e.g., whether the transmission is unicast, multicast, etc.); and type of WTRU (e.g., capabilities).

The WTRU may select between a number of pre-defined BWs or BW configurations based on a QoS parameter associated with the data to be transmitted. This may ensure fairness of the resource selection procedure by allowing WTRUs with different timing requirements to select from the same amount of resources (e.g., a WTRU with tight timing requirements is not constrained to select from a smaller amount of resources compared to a WTRU with larger timing requirements). It may also force a WTRU with less time-critical data to select resources that may be more distant in time by restricting the amount of resources overall frequency resources in the selection process. In conventional V2X, the selectable BW for all WTRUs may be the same, which may result in an unfair advantage for WTRUs with less critical time requirements to have a larger amount of resources from which to select from for transmission.

The WTRU may determine a frequency location (e.g., center frequency, reference frequency, bandwidth part, etc.) of the selectable resources, and may possibly use different frequency location with every transmission or selection process. The WTRU may determine such frequency location based on one or more of the following criteria: random selection; WTRU measurements (e.g., RSSI, CBR, or sensing results/measurements applied per subband, bandwidth part, pool, etc.); time criticality determination as defined above and/or other QoS characteristics of the transmission such as priority; WTRU ID (e.g., destination address or transmitting WTRU address); QoS flow ID, Radio bearer ID, or similar identification related to the data being transmitted; and a previous selection of the center frequency by the WTRU (e.g., rules such as avoiding selection of the same center frequency two times in a row).

The WTRU may first determine the RSSI of the total set of resources in the resource pool, carrier, BWP, etc. The WTRU may then select a center frequency or location such that is minimizes the average RSSI of the selectable resources in the bandwidth B, as per the previous solution.

The WTRU may determine all possible center frequency locations such that a frequency-contiguous set of resources with bandwidth B can be obtained within the resource pool, BWP, carrier, etc. The WTRU may then select randomly among one of these possible center frequency locations.

Figure 3:
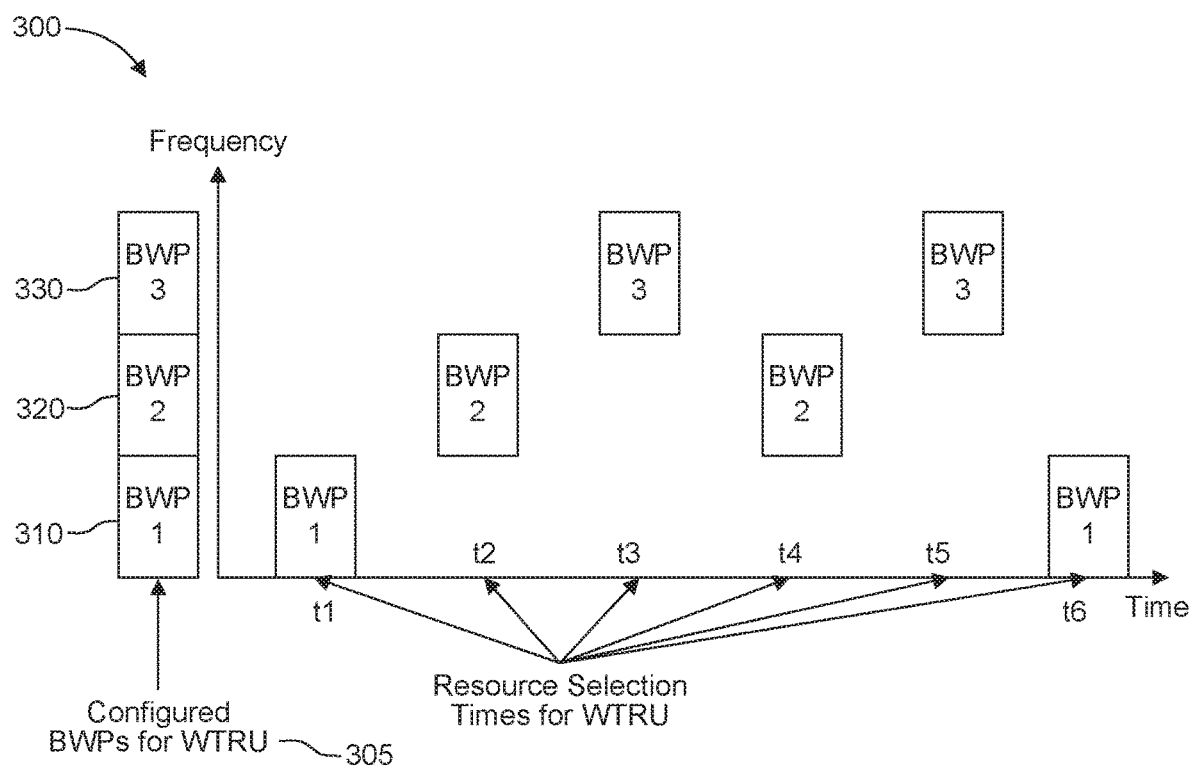
FIG. 3 is a diagram illustrating an example resource selection based on different center frequencies or bandwidth parts (BWPs)

FIG. 3 illustrates an example resource selection 300 based on different center frequencies or bandwidth parts (BWPs), which may be used in combination with any of other embodiments described herein. As illustrated in FIG. 3, a WTRU may be configured with a number of possible center BWPs 310, 320, 330 to use for determination of selectable resources and may select one of the center frequencies randomly, or based on some factor(s) to achieve randomization such as WTRU ID, flow ID, etc. This approach may maintain an equal bandwidth for different criticality transmissions while maximizing the overall bandwidth or resource pool utilization. For example, WTRUs having low latency (or latency critical) transmissions may be configured to use multiple center frequencies or BWPs such as BWP 1 310, BWP 2 320, and BWP 3 330 for resource selection where total bandwidths are split into three BWPs 310, 320, 330. Other WTRUs having high latency (or latency non-critical) transmissions may only be configured to use a single center frequency or a section of the total bandwidth for resource selection. When selecting resources for the low latency transmissions, the WTRUs with high latency (or latency non-critical) transmissions may periodically change its BWP or a section of the total bandwidth on which it performs resource selection. For example, at time t1, the WTRU may perform resource selection for BWP 1 310. At time 2, the WTRU may perform resource selection for BWP 2 320. At time 3, the WTRU may perform resource selection for BWP 3 330. In this way, the overall bandwidth or resource pool utilization can be maximized.

The WTRU may determine the start time (e.g., symbol, slot, etc.) of a resource selection window based on the time criticality of the resources. Specifically, the WTRU may determine the earliest (in time) selectable resource based on the time criticality of the transmission. The relation of start time and time criticality may be configured by the network or pre-configured, and may further depend on additional factors such as: size of transmission; reliability of data to be transmitted; channel occupancy, channel busy ratio (CBR), or similar channel measurements; size of the BWP and carrier; number of beams required, beam angle, or beam-sweeping frequency; type of transmission (e.g., multicast, unicast, broadcast); and some randomness factor derived from any of the above quantities. For example, a WTRU having low latency (or time critical) transmissions may initiate the resource selection immediately after the WTRU receives packets. However, a WTRU having high latency (or time non-critical) transmissions may defer its resource selection for a period of time when it receives packets, thereby allowing the WTRU with low latency transmissions to have more resource to select.

In an example, a WTRU may determine the selectable set of resources to occur in a time window between T1 and T2, where T2 corresponds to the latest allowable transmission time for the packet, and T1 may be set to a number of slots before T2. The number of slots may be further determined by one or more of: the size of the WTRU's transmission; channel occupancy (e.g., CBR) measured by the WTRU; pool configuration; and time criticality of the data.

A WTRU may determine T1 based on the time criticality of the data and a randomness factor. More specifically, a WTRU may determine T1 to be a random variable between 0 and T2. For time-critical WTRUs, the random variable will increase the probability of selecting a T1 close to 0. For non-time-critical data, the random variable will increase the probability of selecting a T1 close to T2.

This approach may avoid a WTRU selecting resources located close in time to the resource selection instant when the transmissions are not-critical, thus reserving such resources for other WTRUs which may have more critical transmissions.

A WTRU may include, in the set of selectable resources, only the resources associated with transmission of a beam or set of beams. A WTRU may be configured with a beam or set of beams for which the WTRU should transmit a PDU on. More specifically, such beam or set of beams may correspond to transmission to a single WTRU (e.g., unicast transmission) or a set of WTRUs located in specific direction (e.g., multicast for platooning).

A WTRU may be configured with a set of resources that can be part of the selectable resources for a given destination address, destination WTRU ID, or similar. A WTRU may determine the destination address for a transmission and may include, in the set of selectable resources, only those resources which correspond to the allowed beams for transmission on those resources.

A WTRU may be configured with a sequence of periodically occurring time resources (e.g., slots, symbols) associated with a specific direction or resource configuration. In addition, the WTRU may be configured by the NW) with or may determine autonomously (e.g., based on measurements and/or monitoring of reference signals) the time offset associated with each set of periodically occurring resources. The WTRU may also change/adjust the time offset between instance of resource selection for the same set of beams. For instance, every nth resource (relative to a reference time or offset) may be associated with a beam. The WTRU may be configured with multiple such directions or resource configurations for a transmission. For example, configuration 1 may be (slot 0, n, 2n, 3n, . . . ). Configuration 2 may be (slot 0, 1, 2, . . . , n, n+1, n+2, n+3, . . . 2n+1, 2n+2, 2n+3, . . . ).

A resource configuration may include all resources in time (omni-directional transmission). Other configurations may be associated with transmissions on only a subset of beams. The WTRU may be further configured with a mapping of a transmission to one or more resource configurations. Such mapping may be determined by the WTRU (possibly for each transmission or for a set of transmissions) based on any or a combination of the following criteria.

The mapping may be determined by a destination address or similar ID identifying the receiving WTRU, group of WTRUs, or receiving service of the transmission. For example, one destination address may be associated with unicast and the WTRU may transmit using a configuration which transmits only on one or a subset of beams. A second destination address may be associated with broadcast and the WTRU may choose a configuration associated with all beams (omnidirectional).

The mapping may be determined the pool configuration. For example, the WTRU may select a transmit pool which defines the configuration to be used. Alternatively, resource configurations may be associated with multiple/all pools.

The mapping may be determined by QoS-related characteristics of the transmission such as timing (PDB), priority, reliability, or range requirements.

The mapping may be determined by measurements/reception of a specific signal (e.g., reference signal) or transmission from another WTRU. The mapping may be determined by an indication from the upper layers.

The mapping may be determined by WTRU speed. For example, the WTRU may be configured to transmit on more beams as it increases its speed.

The mapping may be determined by radio bearer identification and/or QoS flow identification.

A WTRU may associate a transmission with a destination address to be a unicast transmission and may select its configuration to correspond to the beams which can be used to communicate with that WTRU. The information may be determined/indicated by upper layers (e.g., the upper layers may provide a configuration associated with the destination and indicate any change in such association). The information may be provided by the network (e.g., RRC, MAC, L1 signaling, or the like). The information may be based on the timing of received transmission from another WTRU (possibly associated with destination or ID of the first WTRU's transmission). For example, the WTRU may be configured with a mapping between a received resource configuration and a transmit configuration. A WTRU may determine one or more transmission configuration based on the reception configuration in which the other WTRU's transmissions were received/measured (e.g., with certain quality).

A WTRU may include in the selectable resource set only those resources (possibly in a time window [t1,t2]) which correspond to the configurations of the destination of the PDU to transmit. The configurations associated to a destination may be indicated to the WTRU by upper layers. A WTRU may further receive a PDU to be transmitted to multiple destination addresses. In such case, the WTRU may include resources in the selectable resource set consisting of the union or intersection of the resource configurations for the different destinations.

In another example, a WTRU may further determine the configurations based on QoS characteristics such as reliability. A WTRU may select a configuration associated with higher reliability (e.g., associated with a larger number of beams) for a higher reliability transmission.

A WTRU may decide to defer transmission to a subsequent transmission window or set of selectable resources when resource selection does not generate an acceptable resource. Specifically, a WTRU may determine a first set of selectable resources on which to perform resource selection. If resource selection generates an acceptable set of resources, the WTRU may perform transmission on these resources. Otherwise, the WTRU may defer to a subsequent set of allowable resources. The WTRU may further perform a new resource selection, for the same data and/or additional data, on the subsequent set of allowable resources. The WTRU may perform such subsequent resource selection at a later time.

A WTRU may consider resource selection to be successful on a set of selectable resources based on any or a combination of the following criteria: the amount of "available" resources in the selectable set is deemed above a threshold; the measured RSRP, RSSI, CBR, or similar of all or a set of resources is above/below a threshold; absence of one or a number of higher priority transmissions are detected in the available set of resources; and time criticality of its own transmissions. Additional criteria for availability that are also applicable may be described below.

A WTRU may change any of the following in each subsequent resource selection attempt for a given transmission. The WTRU may change criteria of successful resource selection. For example, the WTRU may change a threshold, utilization criteria, or similar parameter with each successive resource selection step in order to make successful resource selection more likely as the set of selectable resources approaches the transmission timing requirements of the packet.

The WTRU may change the amount of resources in the selectable set. The WTRU may change the amount of resources in the selectable set after deferring transmission on a selectable set by increasing the BW, considering alternate and/or additional BWP or carriers, considering additional beams, or changing beam angle.

The WTRU may change the nature/granularity of resources. The WTRU may change the granularity of resources with subsequent selection attempts for the same transmission. For example, the WTRU may change from selection using slot-based resources to symbol-based resource after it defers transmission on a given set of selectable resources.

The WTRU may determine the initial set of selectable resources as a time window of length L from the arrival of the packet. The WTRU may determine the value of L based on the time criticality of the data to transmit (e.g., L may be a function of a time criticality parameter such that L is smaller than the required transmission time of the packet). For example, the WTRU having packet transmission requirement of 500 ms may be configured with multiple successive time windows of length 100 ms starting from the arrival of a packet. If resource selection does not succeed in the first window, the WTRU may defer transmission to a subsequent window of length L starting immediately or some time after the first window. In one option, the WTRU may perform resource selection on the subsequent window at a later time (e.g., at the start of the subsequent window). In another option, resource selection on the subsequent window can be performed immediately after failing to select resources in the first window. In the subsequent window, the WTRU may increase the (e.g., RSRP, RSSI) threshold for determining whether a specific resource is occupied based on sensing results collected for that resource. Alternatively, the WTRU may decrease the allowable number of available resources required for successful selection from the available resources.

A WTRU may first determine a transmission granularity to be used for transmission of packet. This approach may be applicable, for example, if the determination of the selectable resources does not distinguish between symbol-based and slot-based resources or where both slot-based or symbol based transmissions are allowed on the same set of resources. A WTRU may be configured with a lower-layer mechanism to transmit data in symbol-based fashion or slot-based fashion once the resources are selected from the set of selectable resources. The lower layer mechanism may allow the combination of contiguous or non-contiguous symbols selected by the WTRU from the set of selectable resources. The WTRU may further be restricted to selection of only a specific combination of symbol based resources based on rules, pool configuration, or configuration of a set of symbol combination patterns.

Transmission of a packet, as described herein, may comprise transmission of multiple repetitions of the same packet in different resources for purposes of beamsweeping (e.g., transmitting the same packet in different beams) or repetition (transmission of multiple redundancy versions), or both.

A WTRU may determine the transmission granularity (e.g., whether to use slot or symbol) to use for a packet transmission based on one or more of the following criteria.

The WTRU may determine the transmission granularity to use for transmission of a packet by deriving it from the time criticality parameter. For example, the WTRU may be configured with mapping of logical channel or LCG to granularity (symbol or slot) and may be further configured with a mapping of priority (e.g., PPPP) to logical channel or LCG. In another example embodiment, the WTRU may be configured with a mapping of QoS flow and/or sidelink radio bearer to logical channel (or LCG) and with a mapping of logical channel (LCG) to granularity. When data arrives from the application layer, the WTRU transmits on the SL resources with the associated granularity. A WTRU may multiplex data with different time criticality (e.g., different flows or different PPPP) on the same transport block, in which case the highest priority/criticality determines the resource granularity to use.

The WTRU may be configured with mapping of required latency (e.g., time to transmit) to a resource granularity. The required latency may be the worst-case latency for all or a portion of the PDU to be transmitted by the PHY layer.

The WTRU may determine the allowable resources for transmission based on a fixed configuration (e.g., different pools of symbol-based versus slot based), or autonomously).

The WTRU may determine the resource granularity for transmission based on the results of sensing and/or determination of availability information. More specifically, the WTRU may use one or a combination of the following decision criteria for decision of the transmission granularity of a MAC PDU.

The WTRU may use the best resource, such as resource with lowest RSSI or average RSSI. The WTRU may use the total amount or ratio between the available symbol-based resources and slot-based resources. The WTRU may use an occupancy ratio (CR) giving the ratio of resources used by the WTRU to the total available or selectable resources in a given window. For example, the WTRU may compute a separate occupancy ratio for symbol-based and slot-based resources, and may select the granularity with the lowest ratio, or the granularity that does not cause the WTRU to exceed a threshold CR.

The WTRU may use time criticality, potentially in combination with other criteria. The WTRU may use a measure of the total channel occupancy (e.g., CBR). For example, the WTRU may use CBR in the determination of transmission granularity. The WTRU may measure a separate CBR for slot-based resources and symbol-based resources and maintain a separate CBR value.

The WTRU may use random selection. For example, the WTRU may determine the available resources, potentially slot-based and symbol-based, which can be used to transmit the MAC PDU, and then apply random selection on the combination of slot-based and symbol-based resources.

The resource granularity for transmission may be based on a configured minimum/maximum. For example, a WTRU may be configured with a minimum and/or maximum number of subchannels or resource blocks for slot-based transmissions and/or symbol-based transmissions. The WTRU may select to use symbol-based transmissions as long as the required number of symbols to transmit the packet does not exceed the configured maximum. The configured maximum/minimum number of slot-based and/or symbol-based resources for a transmission may further depend on other parameters, such as CBR, priority (PPPP), reliability (PPPR) or other QoS related parameter.

The resource granularity for transmission may be based on message or PDU size.

A WTRU with a criticality parameter above a threshold (e.g., time critical data) may transmit the data using symbol-based transmission. A WTRU with criticality parameter below a threshold (e.g., non-time critical data) may be allowed to transmit using slot-based or symbol-based transmission. The WTRU may select symbol-based resources if the CBR of symbol-based resources is below a threshold, and/or the CR for symbol-based resources is below a threshold and/or the RSSI of the selected symbol-based resources is below a threshold.

A WTRU may be configured with a maximum number of symbol-based subchannels (e.g., RBs) and a maximum number of slot-based subchannels. Based QoS-related parameters associated with the data to transmit, a WTRU may be allowed to select symbol-based resources or slot-based resources, and selects symbol-based resources as long as the PDU for transmission can be transmitted within the maximum number of configured symbol-based subchannels for a transmission. The WTRU may further make such decision conditioned on the CBR and/or CR and/or reliability requirements.

A transmission may be mapped by configuration to a preferred granularity. A WTRU may transmit using that granularity if it finds available resources of that granularity within the timing requirements of the packet. The conditions or criteria for determination of availability are further described herein. Otherwise, the WTRU may transmit the resource with the less preferred granularity.

A WTRU may determine the availability of resources based on one or a combination of the following: RSSI of a time/frequency/beam resource; determination of an indication by another WTRU (e.g., through SCI) that it is using the time/frequency/beam resource; determination that such indication is measured above a threshold, where the threshold may be determined based on any of the other conditions (e.g., priority of WTRU's transmission); priority of the WTRU's own transmission; priority of the other detected WTRU's transmission; range and/or reliability requirements of a WTRU's own transmission; and range and/or reliability requirements of another WTRU's transmission.

A WTRU may determine the availability of resources from sensing results differently, depending on the granularity of the resources it will transmit on.

A WTRU may be provided with different sensing results for different granularities (e.g., slot-based results and symbol-based results). When performing resource selection, a WTRU may utilize the sensing results associated with the specific granularity it will use to transmit. A WTRU may further enable/disable sensing operation (e.g., performed by lower layers) based on upper layer indication that a specific service is enabled/disabled or may/may not generate data to be transmitted for a certain period of time.

A WTRU may be provided with sensing results based on the minimum granularity. A WTRU may determine the availability of a fine granularity (e.g., symbol-based) resource based directly on the sensing results. A WTRU may use certain rules to determine the availability of slot-based resources based on the sensing results of symbol-based resources. A WTRU may determine the availability of a slot-based resource based on any or a combination of the following criteria in addition to those mentioned previously, such as priority, range, or a WTRU's own or other transmission, etc.

The WTRU may determine availability of slot-based resources based on availability or occupancy of any of the symbols in the slot. For example, the WTRU may determine a slot to be occupied/available if there is at least one SCI with RSRP above a threshold which reserves at least one of the symbols in the slots.

The WTRU may determine availability of slot-based resources based on availability or occupancy of a number of symbols in the slot. The number may be (pre)configured and/or may be determined based on any other criteria discussed herein. For example, the WTRU may determine a slot to be occupied if the received RSRP of SCI above a threshold result in the reservation of at least x symbols in the slot.

The WTRU may determine availability of slot-based resources based on position of the available or occupied symbols relative to the WTRU's own transmission. For example, a WTRU may be required to transmit on a specific symbol within a slot or a specific beam within a time/frequency resource, and may determine the resource to be available if at least that specific symbol (or beam) is available.

The WTRU may be provided with only slot-based sensing results and may derive the availability of symbol-based resources based on these sensing results. The WTRU may determine a symbol-based resource is available only if the availability conditions for the entire slot are satisfied. The WTRU may use a different threshold and/or other availability condition for determining symbol availability compared to slot availability For example, the WTRU may determine availability of a resource based on comparison of the SCI RSRP with a threshold. The WTRU may use threshold 1 when determining whether a resource is available if it intends to transmit on the entire slot, and it may use threshold 2 when determining if the resource is available when it intends to transmit on a single symbol of the slot.

A WTRU may consider the transmission range or distance and/or the required reliability for its own and/or other detected WTRU transmissions when determining the availability of a resource. The transmission range (or range) may be a minimum communication range (MCR) that should meet the QoS requirement such as reliability and latency or other criteria for V2X communications. Examples of the range may include, but are not limited to, the distance between WTRUs, a size of V2X group, a number of WTRUs in a V2X group, V2X group arrangement, and any other indicator indicating small, medium, or large metric for V2X communications between WTRUs or in a group of WTRUs. The transmission range (or range) may be received from other WTRUs via a sidelink control channel (e.g., SCI), or from the network such as a base station, V2X control function, PCF, or V2X application server. It may alternatively or additionally be preconfigured in the WTRU.

A WTRU may include a range-related (e.g., MCR) or reliability-related parameter in its reservation signal (e.g., SCI). Such parameter may be indicated with one or more of the following: a required distance explicitly in the SCI, or index (e.g., from a table) related to a distance; a required received power, received RSRP, or similar; an index related to such (e.g., referenced to a preconfigured table); implicitly as part of the WTRU ID (e.g., a specific WTRU ID or set of WTRU IDs may indicate a range parameter, or portion of the WTRU ID); explicitly signaled as a single QoS value which also indicates other QoS parameters (e.g., a PQI, PFI, or an index to a QoS table that maps the value to a set of QoS parameters, one of which is a range); implicitly determined from one of the receiving WTRUs decoding parameters (e.g., search space, SCI type, CRC check parameters); and/or implicitly based on the reference signals used to transmit SCI (e.g. DMRS pattern). The WTRU may derive such range-related parameter for inclusion of the SCI based on information received from upper layers related to the data to be transmitted.

A WTRU may consider a resource as available/occupied if the conditions related to the range/reliability-related parameter in the SCI are met/not met. Such condition may be determined by comparison of: the received Physical Sidelink Control Channel (PSCCH)/Physical Sidelink Shared Channel (PSSCH) RSRP and/or RSSI with a value related to the range/reliability parameter in SCI; the WTRU's own transmission reliability requirement; the WTRU's current location with a value related to the range/reliability parameter in SCI; and the location of the WTRU transmitting the SCI that reserved the resource in question. The location may be estimated by the WTRU determining resource availability. The location may be determined based on parameters transmitted in the SCI. The location may be indicated by the application layer.

A WTRU that receives the range related parameter, the transmission range, or other WTRU's location information from other WTRUs may use the range information to select available resources in addition to sensing results on the signals received from other WTRUs. For example, a first WTRU may calculate, based on its own location information and a second WTRU's location information, the distance between the two WTRUs. If the distance (or range) between the two WTRUs is below (or within) the required transmission range (e.g., MCR), the first WTRU may not select the resources to transmit data to the second WTRU because of expected interference. However, if the distance (or range) between the two WTRUs is above (or out of) the transmission range, the first WTRU may select the resources and transmit data to the second WTRU.

A WTRU may perform resource selection based on the range parameter (e.g., MCR) of the data it receives from upper layers. A WTRU may select occupied resources with a larger PSCCH/PSSCH RSRP when the MCR of its data is below a threshold, or select unoccupied resources when the MCR is above a threshold.

A WTRU may determine the PSCCH RSRP of another WTRU's transmission. The WTRU may consider an announced resource to be occupied if the received RSRP is larger than a threshold. Such threshold may be derived from the range/reliability-related parameter transmitted in SCI based on a ((pre)configured) table. Namely, the WTRU may associate the range/reliability-related parameter transmitted in SCI with the PSCCH threshold based on such table. The WTRU may further change/adjust/choose such thresholds based on other conditions such as the relative priority between the WTRU's transmission, the received/transmitted granularity, etc.

A WTRU may use a different resource availability determination criteria depending on the value of the range/reliability associated with a WTRU's pending transmission. More specifically, for certain values of the range/reliability requirement associated with a packet transmission, the WTRU may use first criteria, while for other values of the range/reliability requirement, the WTRU may use second criteria. The criteria for high reliability transmissions, for instance, may be more stringent than for other transmissions. The criteria may include, but are not limited to: excluding resources for which another WTRU's SCI is detected and reserves the same or a subset of the resources (e.g., the same slot, or a symbol within a slot); excluding resources for which another WTRU's SCI is detected and reserves resources adjacent (in time/frequency/beam) to the said resources; and use of a more stringent threshold for comparison of PSCCH RSRP for certain values of the range/reliability.

A WTRU may consider resources for which there are no detected SCI transmissions from other WTRUs as the available resources for transmissions which have a certain range/reliability requirement (e.g., PPPR-like parameter>threshold). For other range/reliability requirement (e.g., PPPR-like parameter⇐threshold), the WTRU may allow selection of resources for which other WTRU's have reserved the resources but the PSCCH-RSRP measured by the selecting WTRU is below a threshold. The PPPR-like parameter may be derived by the WTRU based on the VQI.

A WTRU may exclude some or all of the resources for which there are no detected SCI transmissions from other WTRUs reserving those resources. A WTRU may perform such exclusion only for certain values of the range/reliability value associated with pending transmission (e.g., those related to low-reliability requirements). This may limit the amount of completely free resources used by WTRUs with low reliability requirements, leaving these resources for use by the WTRUs having transmissions with high reliability/range requirements. A WTRU may further perform such exclusion as long as the amount of available resources is sufficient for resource selection among those available resources.

A WTRU may use the existing LTE PSSCH-RSRP threshold mechanism for determination of resource availability, but may further increase the threshold by a certain amount for transmissions with specific values of reliability/range.

As described above, in conventional V2X, 20% of the resources in the sensing window may need to be available for resource selection. If these are not available, the WTRU may change the threshold used for resource availability. This approach may not be ideal for NR V2X due to a larger number of WTRUs to be supported and a wider range of QoS requirements.

A WTRU may dynamically determine the amount of sufficient resources based on transmission parameters. The WTRU may determine the amount of available resources (e.g., as an absolute number of resources or a percentage of the total resources considered) which are sufficient to proceed with resource selection (among those available resources) based on one or more of the following factors: measured CBR of the channel; QoS parameter of the data to be transmitted, such as PPPP, PPPR, range parameter, 5QI, or similar; destination address or destination WTRU ID; transmission type such as whether the WTRU is using unicast, multicast, or broadcast; beam direction, number of beams, or beam angle; size of the time window for the selectable resources (e.g., [T1,T2]); number of available resources; and whether the resources and/or the transmission are on slot-based or symbol based resources.

The WTRU may measure the Channel Busy Ration (CBR) of the channel and may determine a percentage x % based on the measured CBR. Such determination may be static or based on a preconfigured table of CBR range to allowable percentage. The percentage may represent the percentage of resources determined as available over the set of all resources in a selection window (e.g., over a time interval [T1,T2]). If the percentage of resources determined as available by the sensing process is below x %, the WTRU may proceed with resource selection within the allowable resources, otherwise, the WTRU may perform one of the alternate procedures discussed herein.

The WTRU may determine a percentage x % based on CBR and/or a combination of parameters derived from VQI. For a given combination of CBR range, and/or PPPP-like parameter, and/or PPPR-like parameter, the WTRU may determine a value of x %. If the percentage of resources determined as available by the sensing process is below x %, the WTRU may proceed with resource selection within the allowable resources, otherwise, the WTRU may perform one of the alternate procedures discussed herein.

The value of x % may depend on the beam angle on which the WTRU is transmitting (i.e., whether the WTRU uses a wide beam or narrow beam). The WTRU may determine one value of x % when intending to transmit the packet on N1 beams, and may determine a different value of x % when intending to transmit a packet on N2 beams.

A WTRU may perform a fallback procedure when the amount of available resources is not sufficient. The procedure may comprise performing one or more of the following actions: retrying resource selection procedure (determination of the available resources), possibly in conjunction with another action which may affect the available resources; performing backoff by a configured, random, or determined time T; changing the transmission mode, or requesting the NW to change the transmission mode (e.g., from WTRU autonomous [Mode4-like] to NW controlled [Mode3-like]); changing the transmission resource pool; changing the RAT (e.g., from NR V2X to conventional V2X); increasing the transmission robustness, such as increasing the number of autonomous retransmissions, changing the MCS, changing the beam angle; completing the resource selection followed by transmission, possibly including an indication of the condition of insufficient available resources in the SCI; dropping the pending transmission; changing from slot-based to symbol-based transmissions, or considering different granularities of resources for transmission (e.g., consider both slot-based and symbol-based transmission as opposed to only slot-based transmissions); and changing the BW or BWP of operation.

The WTRU may further decide which procedure to use based on any of the following: a QoS parameter associated with the data to be transmitted; transmission type (unicast, multicast, broadcast); and beam angle (i.e. whether transmitting on a single beam or multiple beams).

A WTRU may perform a backoff by a randomly selected time T when the amount of available resources in a window of consideration is not sufficient. The value of T may further depend on the time requirements of the data. The WTRU may retry the selection following a time T. The WTRU may further apply such backoff only for data with certain QoS requirements, such as for certain PPPP values or PDB values. A WTRU may, possibly for certain values of QoS parameter (e.g., PPPP, PDB).

A WTRU may (e.g., for certain values of QoS parameter (e.g., PPPP, PDB)) autonomously change the BWP of operation from the current BWP to a BWP having a larger bandwidth. The WTRU may then perform resource selection procedure again on the new BWP.

A WTRU may (e.g., for certain values of QoS parameter (e.g., PPPP, PDB)) repeat resource selection procedure by considering both symbol-based and slot-based resources in the potential resources for resource selection. The WTRU may then determine the amount of available resources considering both slot-based and symbol-based resources. The WTRU then perform one of the other alternate procedures if the amount of resources available is not sufficient following consideration of both slot-based and symbol-based resources.

A WTRU may determine a set of resources from the selectable resources which are available or unused by other WTRUs. A WTRU may then select a resource from the set of available resources based on any or a combination of the following factors and/or criteria.

A WTRU may select a resource based on random selection, potentially from the remaining available resources which may be determined by any of the other factors described herein.

A WTRU may use sensing results such as the SCI RSRP and/or PSSCH RSSI of related resources in the sensing window to select the resources to use for transmission. For example, the WTRU may select resources for which no other WTRUs have forward booked the resources. If no such resources exist in the set of available resources, the WTRU may select the resource which may be booked by another WTRU, but for which SCI RSRP is minimum.

A WTRU may be configured to randomly select between the available resources, where different resources may be weighted based on time. The WTRU may be configured with a different weighting configuration or arrangement (e.g., assignment of weights to resources in time within the window of selectable resources) for different time criticality parameters (e.g., PPPP, packet latency requirement). A WTRU with non-time-critical data may select with higher likelihood a resource which occurs later within the window of selectable resource.

A WTRU may select only from the resources applicable to a specific destination, direction, transmission type (e.g., unicast/multicast/broadcast), or similar. Once the subset of resources for such are determined, the WTRU may use other factors (e.g., random selection, weighted, etc.) to select a resource from these.

A WTRU may select the resources which correspond to the applicable beams for the transmission at the time in which resource selection is triggered. For example, the WTRU may determine a set of allowable time resources (e.g., corresponding to one or multiple beams) that can be used for each destination. For example, such set of resources may be associated with a periodicity configuration configured for a particular destination address or similar, as discussed further herein. The time offset/reference of such resources may also vary with time. A WTRU may maintain sensing results for all time/frequency/beam resources. At the time of resource selection, a WTRU may select a resource from the set of resources associated with the configuration of the particular destinations to transmit to.

A WTRU may select a different number of resources depending on the reliability requirements of a transmission. For example, the WTRU may select more resources for transmissions which have larger range/reliability criteria. Such resources may be contiguous (e.g., to allow larger coding for the initial transmission) or non-contiguous (to allow more repetitions of the same data).

A WTRU may determine a number of repetitions/retransmissions of a transport block based on a QoS parameter associated with the data (e.g., reliability, PPPR, 5QI, or similar). The WTRU may select a number of distinct time/frequency resources within the set of available resources (e.g., in a time period (T1,T2)) which corresponds to the number of repetitions/retransmissions.

A WTRU may select a resource having a specific quality metric depending on a QoS parameter associated with the data to be transmitted. For example, the WTRU may select a resource with a better quality metric to perform transmission of a packet with higher QoS (e.g., higher priority, reliability, range, or similar QoS requirements), and may conversely select a resource with a lower quality metric for packets with lower QoS requirements. The quality metric may be determined by the WTRU using any or a combination of the following criteria.

The quality metric may be determined by detection of SCI reserving resource. A WTRU may determine resources for which it does not detect an SCI transmitted by another WTRU that reserves the resource to have a high quality.

The quality metric may be determined by Physical Sidelink Control Channel (PSCCH) RSRP. For example, the WTRU may determine the quality of a booked/reserved resource for which Physical Sidelink Shared Channel (PSSCH) RSRP is lower than another booked/reserved resource to be of higher quality than that resource.

The quality metric may be determined by PSSCH RSSI. For example, the WTRU may determine the quality of a resource based on the PSSCH RSSI of related resources which occurred in the past (e.g., associated with the same beam, fixed periodicity, same time/frequency location, same channel, etc.).

The quality metric may be determined by presence of adjacent resources (in time/frequency/beam). A WTRU may determine resources for which other WTRU transmissions are planned on adjacent resources (e.g., in the dimensions of time, frequency, or beam) to be lower quality. For example, a symbol in a slot for which another WTRU has already reserved another symbol may be considered lower quality.

A WTRU may be preconfigured with a randomness factor which is used to determine which resource to select among the available resources. The randomness factor may point to the specific resource to select among the available resources, or may be used as part of hashing function or randomization to select among the available resources. The WTRU derive the randomness factor based on one or more of the following criteria: V2X or ProSe WTRU ID of the WTRU performing the resource selection; destination Address of WTRU ID; QoS parameter of the data to be transmitted, such as PPPP, PPPR, 5QI, or similar; sequence number of the packet, such as PDCP/RRC SN, or application layer SN; NW configured value; preconfigured value; and geographical location (e.g., zone, GPS location, etc.). For example, the WTRU may determine its randomness factor from its GPS location, or the index/identity of the configured zone or geographical area in which the WTRU is located.

The selection/hashing function may be a modulo operation. For example, the resources may be ordered in time/frequency and selection is performed of the Nth value, modulo the number of resources. The WTRU may use the randomness factor as the value of N.

The selection/hashing function may be a configured/determined association of resources to randomness factor. For example, the WTRU can be configured with a set of resources, a BW, one or more subchannels, bandwidth part, or similar that are usable for a given configured randomness factor.

Compared to the random selection in conventional V2X, this approach may reduce the need to have a large percentage (i.e., 20%) of available resources to avoid the selection of the same resources by multiple WTRUs simultaneously performing the resource selection process. The WTRU may be allowed to perform transmission when less than 20% of the resources are determined as available, since it does not rely on random selection.

A WTRU may be configured to transmit in sidelink on different (e.g., overlapping or non-overlapping) bandwidth parts (BWPs). A bandwidth part for sidelink may be defined by a set of sidelink subchannels or resource blocks in frequency on sidelink subframes/slots/symbols. Resource selection may take place in the case where a WTRU can transmit sidelink data on multiple bandwidth parts.

A WTRU may first perform resource selection on a first BWP. If resource selection fails on the first BWP, the WTRU may then perform resource selection on a second BWP. The failure of resource selection may be a result of one or more of the following: inability to find a sufficient number of available resources to satisfy resource selection; the measured occupancy (e.g., Channel Busy Ratio (CBR), measure of number of SCI transmissions, etc.) of the first BWP is above some amount; and inability to satisfy one of the QoS requirements for data based on the available resources.

When changing to resource selection in a second BWP the WTRU may continue to perform resource selection in the second BWP for subsequent resource selection operations. The WTRU may return to performing resource selection in a first BWP upon one or more of the following: expiry of a timer; a set of related transmissions requiring different resource selection operations is completed successfully; and the WTRU no longer has data associated with transmission of a certain priority or QoS characteristic to be transmitted.

A WTRU may determine whether a transmission is allowed and/or the amount of resources to transmit in one BWP/pool based on the observed resource utilization in another BWP/pool (or portion thereof). More specifically, a WTRU may measure the utilization in another BWP/pool (or portion thereof) to determine how many resources it should select from its own BWP/pool. The WTRU may decide to perform any of the following actions when detecting a large/small utilization on a different BWP/pool. The WTRU may defer transmission on the initial pool for a period of time. The WTRU may drop/preempt its transmission planned for the initial pool. The WTRU may change carrier/pool/BWP. The WTRU may reduce the amount of resources selected (e.g., periodicity, number of RBs, total amount of time/frequency resources, etc.) by a certain amount.

A WTRU may measure utilization in another BWP/pool (or portion thereof) based on mechanisms described herein. A WTRU may determine the usage or utilization of a portion of a pool or BWP. The portion of a pool or BWP may consist of resources that the WTRU is itself not configured to use for a specific transmission. The portion may depend on its own pool configuration. The usage may be considered only for this portion of the pool or BWP rather than the entire BWP.

A WTRU may be configured with multiple pools associated with different priorities and/or latency requirements. Priority and/or latency requirement may be derived from VQI. The pools may also have some resources that are overlapping, such that a high priority WTRU can use all of the resources usable by the low priority WTRU, as well as additional resources not usable by the WTRU. A WTRU may be required to preempt its own transmission in a low priority pool if it detects the CBR of the resources associated with the high priority WTRU (and not overlapped with its own resources) are above a threshold.

Figure 4A:
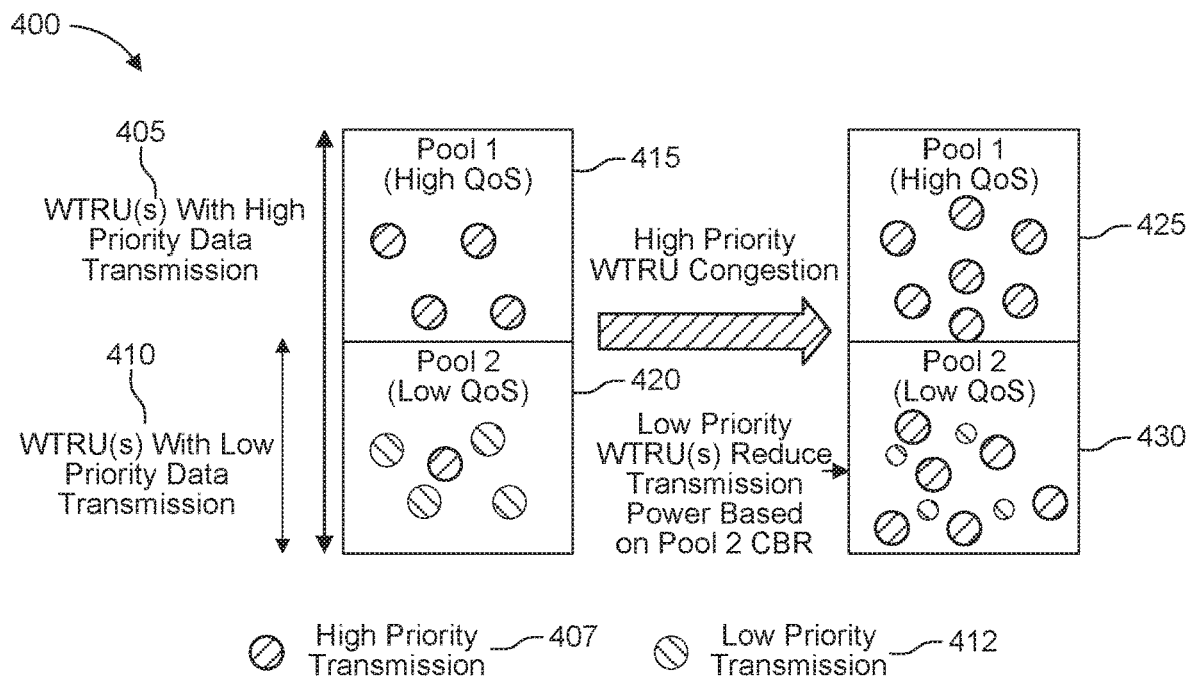
FIG. 4A is a diagram illustrating an example resource selection using Quality of Service (QoS)-based resource pools.

FIG. 4A illustrates an example resource selection 400 using Quality of Service (QoS)-based resource pools, which may be used in combination with any of other embodiments described herein. As illustrated in FIG. 4A, multiple resource pools such as pool 1 415 and pool 2 420 may be configured in one or more WTRUs based on QoS requirement (e.g., priority). For example, pool 1 415 may be configured with high priority transmissions 407, and pool 2 420 may be configured with low priority transmissions 412 as well as high priority transmission 407. One or more WTRUs with high priority data 405 may be configured to use pool 1 415, pool 2 420, or both pool 1 415 and pool 2 420 when transmitting the high priority data (i.e. high priority transmissions 407). One or more WTRUs with low priority data 410 may be configured to use only pool 2 420 when transmitting the low priority data (i.e. low priority transmissions 412). At a certain point when there are more high priority transmissions 407 entering in the resource pools 415, 420 and as a result the resource pools (i.e. pool 1 425 and/or pool 2 430) become more congested, the one or more WTRUs with low priority data 410 may reduce its transmission power based on sensing results (e.g., RSSI, RSRP, or the like) on its own pool 2 430 as described above. In this way, the one or more WTRUs with high priority data 405 may use the congested resource pools 425, 430 more efficiently. As used herein, a high priority transmission may refer to a transmission of data associated with high priority and a low priority transmission may refer to a transmission of data associated with low priority.

Figure 4B:
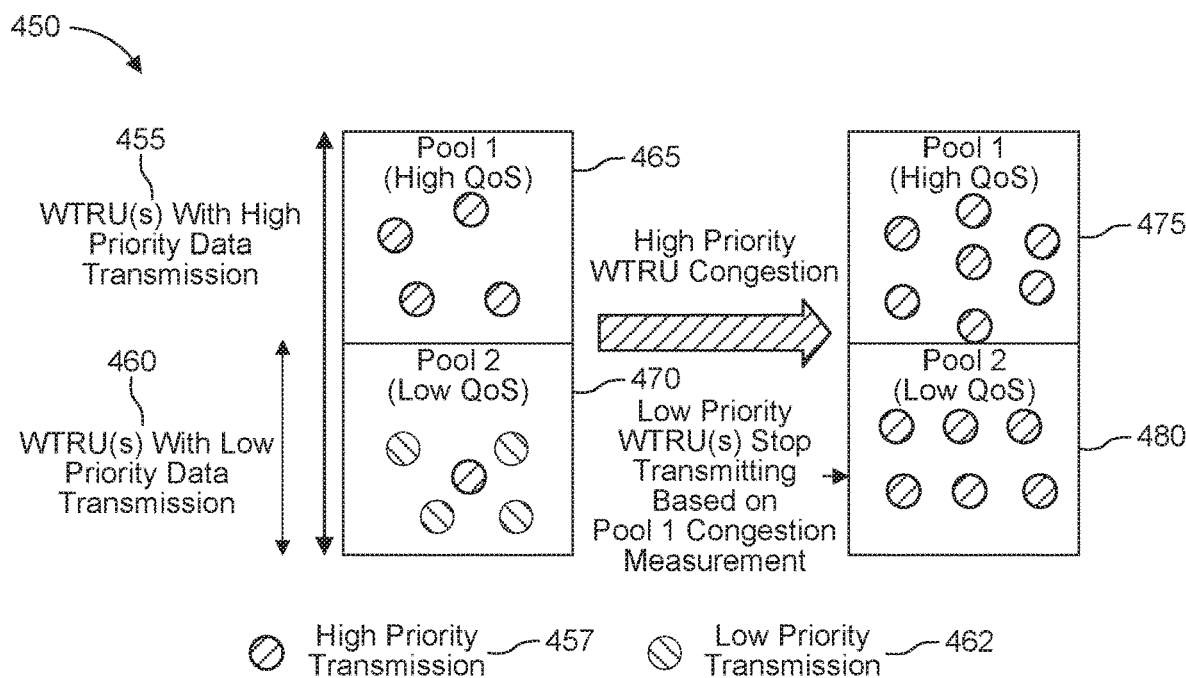
FIG. 4B is a diagram illustrating an example resource selection based on congestion measurements.

FIG. 4B illustrates an example resource selection 450 based on congestion measurements, which may be used in combination with any of other embodiments described herein. Similar to FIG. 4A, multiple resource pools such as pool 1 465 and pool 2 470 may be configured in one or more WTRUs based on QoS requirement (e.g., priority). For example, as illustrated in FIG. 4B, pool 1 465 may be configured with high priority transmissions 457, and pool 2 470 may be configured with low priority transmissions 462 as well as high priority transmissions 457. One or more WTRUs with high priority data 455 may be configured to use pool 1 465, pool 2 470, or both pool 1 465 and pool 2 470 when transmitting the high priority data (i.e. high priority transmissions 457). One or more WTRUs with low priority data 460 may be configured to use only pool 2 470 when transmitting the low priority data (i.e. low priority transmissions 462). At a certain point when there are more high priority transmissions 457 entering in the resource pools 465, 470 and as a result, the resource pools (i.e. pool 1 475 and/or pool 2 480) become more congested, the one or more WTRUs with low priority data 460 may determine whether to stop transmitting the low priority data on its own resource pool (i.e. pool 2 480). The determination to stop transmitting on its own resource pool (i.e. pool 2 480) may be based on the congestion measurements on the resource pool(s) (i.e. pool 1 475) that is not configured to use by the one or more WTRUs with the low priority data 460.

For example, a WTRU having low priority data 460 configured to use the pool 2 460 may perform at least one congestion measurement on pool 1 475 that is not configured to use by the WTRU with low priority data 460. As described above, pool 1 455 is configured to use by other WTRUs with high priority data 455 and not configured to use by the WTRU with low priority data 460. If the congestion measurements on pool 1 475 exceeds a certain threshold, the WTRU with low priority data 460 may defer its own transmission on the pool 2 480 for a period of time. The period of time may be provided by the network, for example, via RRC signaling or may be preconfigured in the WTRU. During the period of time, the deferred low priority data may be accrued in the buffer of the WTRU until it resumes the low priority data transmission 462. In another example, if the congestion measurements on pool 1 475 exceeds a certain threshold, the WTRU with low priority data 460 may pre-empt its planned (or reserved) future transmission on the pool 2 480. In another example, if the congestion measurements on pool 1 475 exceeds a certain threshold, the WTRU with low priority data 460 may reduce the amount of resources that the WTRU with low priority data 460 can select in pool 2 480. The WTRU with low priority data 460 may transmit the low priority data on the remaining resources in pool 2 480. If the congestion measurements on pool 1 475 return to below the threshold (or another threshold), the WTRU with low priority data 460 may continue the low priority transmissions 462 on its pool 2 480.

Although it is not illustrated in FIG. 4B, the WTRU with low priority pool 460 may perform congestion measurements on multiple pools that are configured for high priority transmissions by other WTRUs. The congestion measurements may include, but are not limited to, channel occupancy, received signal strength, channel busy ratio, and any other measurement described in this disclosure. The WTRU with high priority data 455 may also increase or decrease its high priority transmissions 457 on the resource pool(s) (e.g., pool 2 480) that are configured for low priority transmissions 462 based on measurements, congestion measurements, and/or sensing on the low priority resource pool(s) (e.g., pool 2 480) as described in this disclosure.

Figure 5:
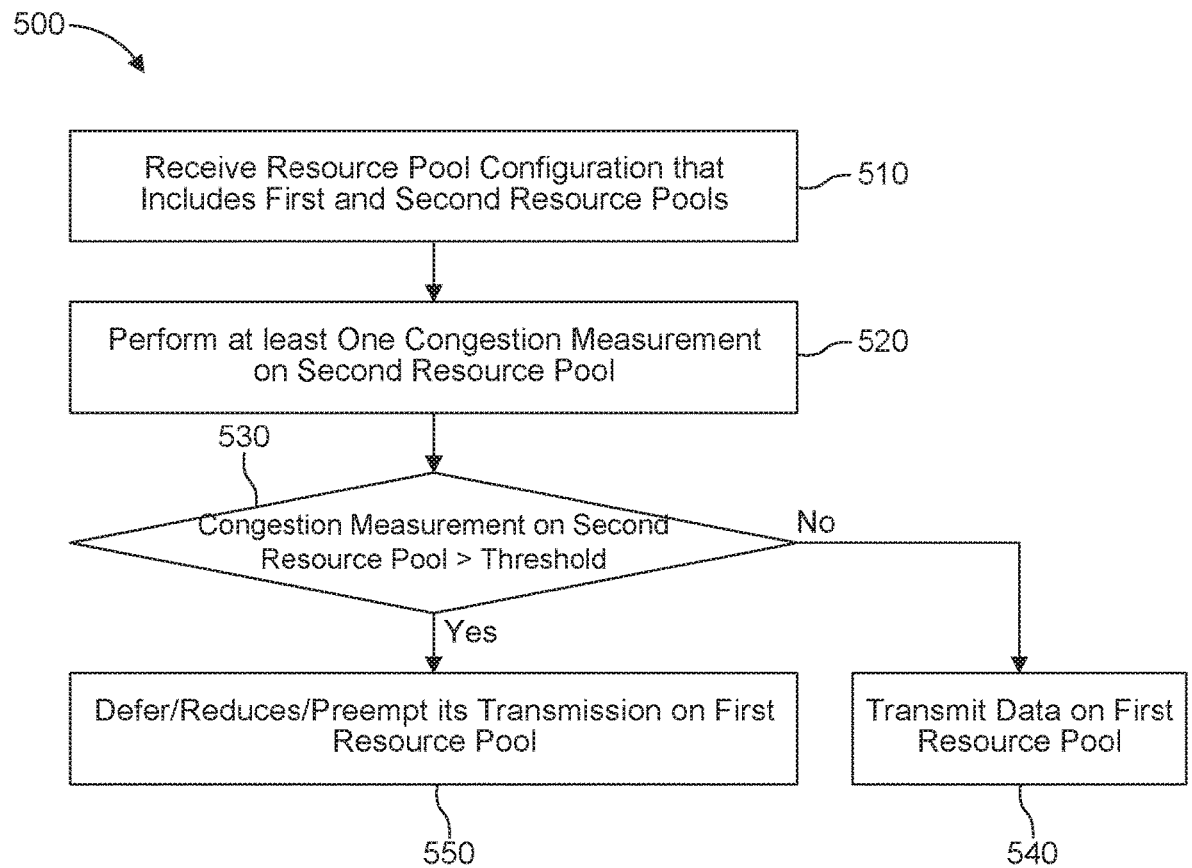
FIG. 5 is a diagram illustrating an example procedure for resource selection based on congestion measurements.

FIG. 5 illustrates an example procedure 500 for resource selection based on congestion measurements, which may be used in combination with any of other embodiments described herein. At step 510, a WTRU may receive, from a base station (BS), a resource pool configuration that includes information associated with multiple resource pools. The information may indicate the use, allocation, or arrangement of multiple resource pools based on QoS requirements (e.g., priority, latency, reliability, and/or data rate). For example, the resource pool configuration may include indications for the first resource pool and the second resource pool. Assuming that the WTRU has only low priority data to transmit, the first resource pool may be configured for low priority data transmissions by the WTRU (and possibly by other WTRUs that are scheduled/assigned for low priority transmissions). The second resource pool may be configured for high priority data transmissions by other WTRUs. The resource pool configuration may be received at the WTRU via RRC singling or system information broadcasting (e.g., SIB). Alternatively or additionally, the resource pool configuration may be preconfigured in the WTRU and/or other WTRUs. The first resource pool or second resource pool may include one or more set of radio resources that comprise one or more elements selected from time, frequency and/or spatial domains.

At step 520, the WTRU configured to transmit low priority data on the first resource pool may perform at least one congestion measurement of the second resource pool on which other WTRUs are configured to transmit high priority data. Based on the congestion measurement of the second resource pool, the WTRU may determine whether to transmit its low priority data using the first resource pool. For example, at step 530, the WTRU may determine whether the congestion measurement is below or above a predetermined threshold. If the congestion measurement of the second resource pool is below the predetermined threshold, the WTRU may transmit its low priority data using the first resource pool at step 540. If the congestion measurement is above the predetermined threshold, the WTRU may not transmit its low priority data using the first resource pool at step 550. The predetermined threshold may be received by the network via RRC signaling or system information broadcasting (e.g., SIB) before the congestion measurement or preconfigured in the WTRU.

In one embodiment, if the congestion measurement is above the predetermined threshold, the WTRU may defer the transmission of data on the first resource pool for a period of time. The period of time may be configured by the network via RRC signaling or system information broadcasting (e.g., SIB) or preconfigured in the WTRU. During the period of time, the data to be transmitted on the first resource pool may be accrued in the buffer or queue of the WTRU until the WTRU resumes its transmission using the first resource pool. In another embodiment, if the congestion measurement is above the predetermined threshold, the WTRU may preempt planned (or reserved) future transmissions of the data on the first resource pool. In another embodiment, if the congestion measurement is above the predetermined threshold, the WTRU may reduce an amount of resources in the first resource pool, and may or may not transmit the data based on remaining resources in the first resource pool.

Examples of the congestion measurements may include, but are limited to, channel occupancy ratio, reference signal received power (RSRP), received signal strength indicator (RSSI), reference signal received quality (RSRQ), channel quality indicator (CQI), signal to noise ratio (SNR), signal to interference plus noise ratio (SINR), signal to noise plus distortion ratio (SIDR), channel busy ratio (CBR), and any other measurements described in this disclosure.

A WTRU may select between different resource selection mechanisms based on QoS/recipient/channel usage. The WTRU may be configured to perform different types of WTRU autonomous resource selection. A WTRU may further be configured to use one type of resource selection mechanism under certain conditions and to use another type of resource selection mechanism under certain other conditions. The conditions which dictate the selection of resource selection mechanism may be determined by one or more of the following criteria. The selection of resource selection mechanism may be determined by QoS of the data to be transmitted on the resources selected. The selection of resource selection mechanism may be determined by intended recipient of the data to be transmitted on the resources selected and/or their relative/absolute location. The selection of resource selection mechanism may be determined by usage conditions of the resources from which to select, such as the measured CBR or sensing results.

A WTRU may be configured with several different resource selection mechanisms. The resource selection mechanisms may be one or more of the following categories. Fully autonomous resource selection may be where the WTRU uses its own sensing results to determine a set of available resources and transmits on a subset of those resources. Autonomous resource selection based on assistance from other WTRUs may be where the WTRU may use assistance information from other WTRUs (e.g. sensing results). Scheduling of resources by one WTRU for another WTRU may be where one WTRU schedules the resources for other WTRUs in a group. Another resource selection mechanism may be use of preconfigured set of resources.

The following example does not preclude the use of different resource selection mechanisms that fall under the same category or are not included in any of these categories. A WTRU may select a resource selection mechanism based on the channel usage or occupancy. The occupancy may be determined based on one or more of: measured CBR, detected number of SCIs (or scheduling messages) and/or measured signal strength of such scheduling messages, detected number of forward resource reservation signals or message that may reserve resources for several or indefinite number of time periods, measured RSSI, application layer information or network signaling indicating usage of a specific pool or set of resources, and umber of WTRUs transmitting one shot and/or periodic resources.

The WTRU may use a resource selection mechanism that reduces the probability of collision under high occupancy and may use a resource selection mechanism which does not account for the possibility of collision under low occupancy.

A WTRU may be configured with resource selection based on sensing only (e.g., LTE) as well as resource selection that requires listen before talk (LBT). A WTRU may measure CBR in the pool of resources for transmission. If the WTRU measures CBR above a threshold, the WTRU may use a LBT-based resource selection. If the WTRU measures CBR below a threshold, the WTRU may use conventional (e.g., LTE) autonomous resource selection.

A WTRU may select a resource selection mechanism based on the QoS of the data to be transmitted. More specifically, the WTRU may recognize the QoS of the data to be transmitted based on one or more of the following. The WTRU may recognize the QoS of the data to be transmitted based on the logical channels multiplexed into the PDU to be transmitted. WTRU may recognize the QoS of the data to be transmitted based on the VQIs or similar QoS parameters (e.g., PPPP, PPPR, etc) associated with the data to be transmitted. This parameter may indicate any of the reliability, latency, range, priority, or data rate of the required transmission.

A WTRU may select a transmission mechanism that is best suited to the QoS parameters associated with the data to be transmitted.

A WTRU may determine the reliability requirement of a packet based on the VQI associated with the logical channel or bearer. The WTRU may consider a first range of VQI to be high reliability and a second range of VQI parameters to be considered as low reliability. A WTRU may use resource selection based on preconfigured resources for high reliability transmission and may use resource selection based on WTRU autonomous selection of resources and/or selection with WTRU assistance for low reliability.

A WTRU may use multiple factors (e.g., QoS, channel occupancy, etc.) to determine the resource selection mode. For example, the WTRU may use LBT transmissions for high reliability transmissions under conditions where the CBR is above a threshold, and may use conventional (e.g., LTE) transmissions otherwise.

As described above, a WTRU in transmission Mode 4 may determine granularity of a time/frequency/beam resources based on pre-configuration or autonomously based on sensing results. The WTRU may determine granularity of resources for resource selection by the service type. The WTRU may determine the amount/percentage of symbol-based and slot-based resources in the set of selectable resources.

The WTRU may determine the selectable resources over a time T (e.g., the selectable bandwidth, granularity, beam width) based on the time criticality of the transmissions. The WTRU may determine BW (possibly varying the center frequency) based on priority/time criticality. The WTRU may determine selection window start time (T1) based on priority/time criticality.

The WTRU may include resources associated with a subset of beams in the set of selectable resources. Beams may be determined based on upper layer information (e.g., destination address, etc.) and QoS information. The WTRU may select resources for specific beams based on a periodic resource configuration. The WTRU may change the offset based on measurements, information received from the other WTRU, or upper layer information.

The WTRU may use multiple resource selection attempts (on different time windows) or defers a resource selection to a future window based on time criticality, CBR, or another parameter. The WTRU may modify resource selection parameters in each subsequent window of the multiple-attempt resource selection.

The WTRU may determine resource granularity to use for transmission if it is not determined during the selectable resource phase based on QoS-related characteristics of the packet, possibly in combination with sensing results/availability information.

The WTRU may determine the resource availability under the assumption of possible transmissions with different granularities. The WTRU may use separate sensing results for symbol-based and slot-based transmissions. The WTRU may determine the availability of a resource for slot-based transmissions based on sensing results associated with symbol-based transmissions and vice-versa.

The WTRU may determine availability of a resource based on another WTRU's range/reliability parameter (transmitted in SCI) and the received RSRP of the SCI.

The WTRU may make a dynamic determination of the amount of sufficient resources for proceeding with resource selection and new fallback procedures in case of failure.

Resource selection (from the set of available resources) may be based on one or more of: weighting of resources in time based on time criticality; a number/amount of resources selected based on reliability/range requirements associated with the data transmission; a quality of the resources compared to QoS characteristics; and the use of a pre-configured selection factor to hash a WTRU to one of the available resources.

The WTRU may make a temporary transmission/resource selection on a second sidelink BWP when resource selection on a first BWP fails.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
   selecting, from a set of percentage value thresholds configured in the WTRU, a percentage value threshold based on a quality of service (QoS) parameter associated with data to be transmitted, wherein the percentage value threshold indicates an available resource percentage that corresponds to the QoS parameter of the data to be transmitted; and
   on a condition that a number of available resources determined based on the QoS parameter of the data to be transmitted is above or equal to a threshold determined based on the percentage value threshold selected from the set of the percentage value thresholds, transmitting, using at least one of the available resources, the data to another WTRU.

2. The method of claim 1, further comprising:
   on a condition that the number of available resources determined based on the QoS parameter of the data to be transmitted is below the threshold determined based on the percentage value threshold selected from the set of percentage value thresholds, increasing a reference signal received power (RSRP) threshold for a resource selection.

3. The method of claim 1, further comprising:
   receiving configuration information that includes information indicating the set of percentage value thresholds.

4. The method of claim 1, further comprising:
   determining the available resources for a resource selection.

5. The method of claim 4, wherein the available resources are determined based on ProSe per packet priority (PPPP), ProSe per packet reliability (PPPR), one or more range parameters, or one or more 5G QoS indicators (5QIs).

6. A wireless transmit/receive unit (WTRU) comprising:
   a processor; and
   a transceiver, the processor and the transceiver configured to:
      select, from a set of percentage value thresholds configured by the processor, a percentage value threshold based on quality of service (QoS) parameter associated with data to be transmitted, wherein the percentage value threshold indicates an available resource percentage that corresponds to the QoS parameter of the data to be transmitted; and
      transmit, on a condition that a number of available resources determined based on the QoS parameter of the data to be transmitted is above or equal to a threshold determined based on the percentage value threshold selected from the set of the percentage value thresholds, the data to another WTRU using at least one of the available resources.

7. The WTRU of claim 6, wherein the processor and the transceiver are further configured to increase, on a condition that the number of the available resources determined based on the QoS parameter of the data to be transmitted is below the threshold determined based on the percentage value threshold selected from the set of percentage value thresholds, a reference signal received power (RSRP) threshold for a resource selection.

8. The WTRU of claim 6, wherein the processor and the transceiver are configured to receive configuration information that includes information indicating the set of percentage value thresholds.

9. The WTRU of claim 6, wherein the processor is configured to:
   determine the available resources for a resource selection.

10. The WTRU of claim 9, wherein the available resources are determined based on ProSe per packet priority (PPPP), ProSe per packet reliability (PPPR), one or more range parameters, or one or more 5G QoS indicators (5QIs).

* * * * *